(12) United States Patent  (10) Patent No.: US 8,688,894 B2
Kuehne  (45) Date of Patent: Apr. 1, 2014

(54) PAGE BASED MANAGEMENT OF FLASH STORAGE

(75) Inventor: Reinhard Kuehne, Reichenau (DE)

(73) Assignee: Pioneer Chip Technology Ltd., Zhubel (TW)

( * ) Notice: Subject to any disclaimer, the term of this patent is extended or adjusted under 35 U.S.C. 154(b) by 683 days.

(21) Appl. No.: 12/584,299

(22) Filed: Sep. 3, 2009

(65) Prior Publication Data

US 2011/0055458 A1    Mar. 3, 2011

(51) Int. Cl.
 *G06F 12/10*    (2006.01)
(52) U.S. Cl.
 USPC ..... 711/103; 711/114; 711/207; 711/E12.061
(58) Field of Classification Search
 USPC .......................................... 711/103, 114, 207
 See application file for complete search history.

(56) References Cited

U.S. PATENT DOCUMENTS

| | | | |
|---|---|---|---|
| 5,404,485 A | 4/1995 | Ban | |
| 5,963,983 A | 10/1999 | Sakakura et al. | |
| 6,591,328 B1 | 7/2003 | Iida et al. | |
| 6,598,115 B2 | 7/2003 | Kaki et al. | |
| 7,386,655 B2 | 6/2008 | Gorobets et al. | |
| 7,386,700 B2 | 6/2008 | Lasser | |
| 2006/0069852 A1 | 3/2006 | Aasheim et al. | |
| 2008/0195801 A1* | 8/2008 | Cheon et al. | 711/103 |
| 2009/0172259 A1* | 7/2009 | Prins et al. | 711/103 |

OTHER PUBLICATIONS

"A Space-Efficient Flash Translation Layer for Compactflash Systems," by Jesung Kim et al., IEEE Transactions on Consumer Electronics, vol. 48, No. 2, May 2002, pp. 366-375.

* cited by examiner

*Primary Examiner* — Kenneth Lo
(74) *Attorney, Agent, or Firm* — Saile Ackerman LLC; Stephen B. Ackerman; Billy Knowles

(57) ABSTRACT

Methods and circuits for page based management of an array of Flash RAM nonvolatile memory devices provide paged base reading and writing and block erasure of a flash storage system. The memory management system includes a management processor, a page buffer, and a logical-to-physical translation table. The management processor is in communication with an array of nonvolatile memory devices within the flash storage system to provide control signals for the programming of selected pages, erasing selected blocks, and reading selected pages of the array of nonvolatile memory devices.

23 Claims, 17 Drawing Sheets

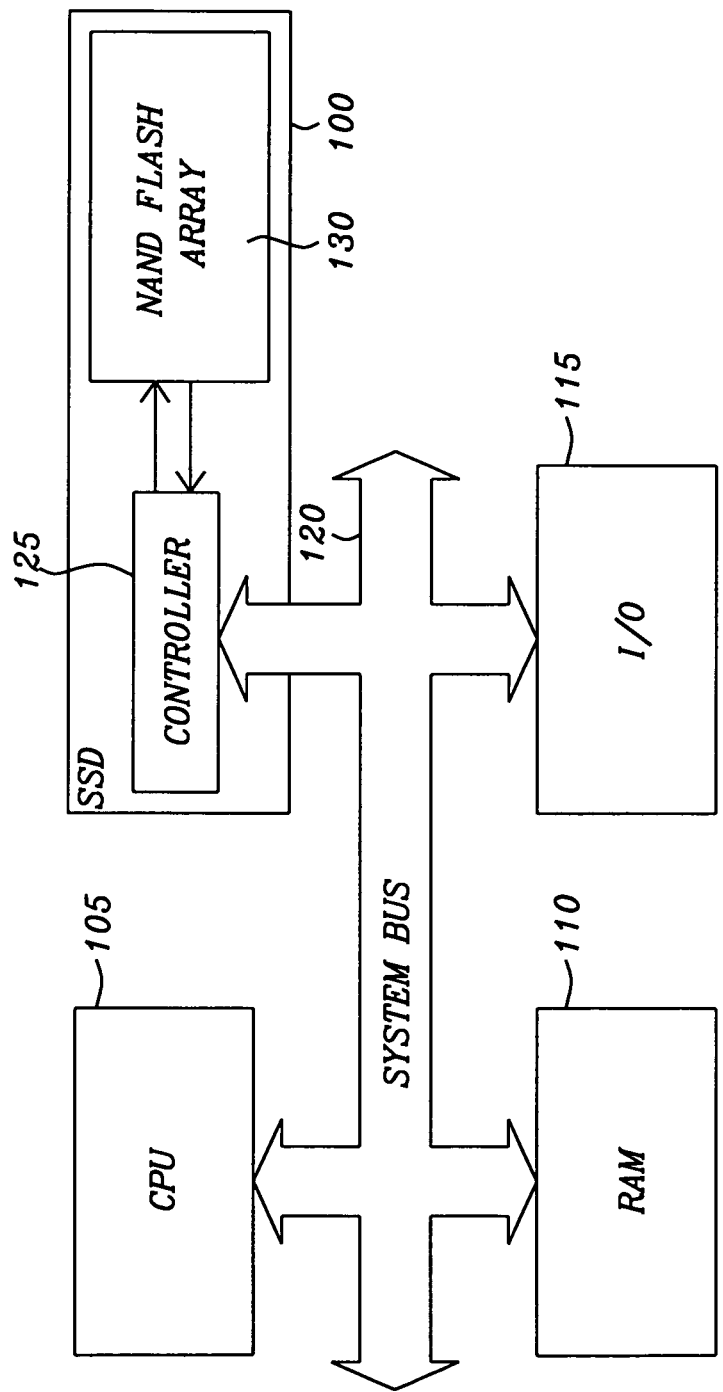
FIG. 1a – Prior Art

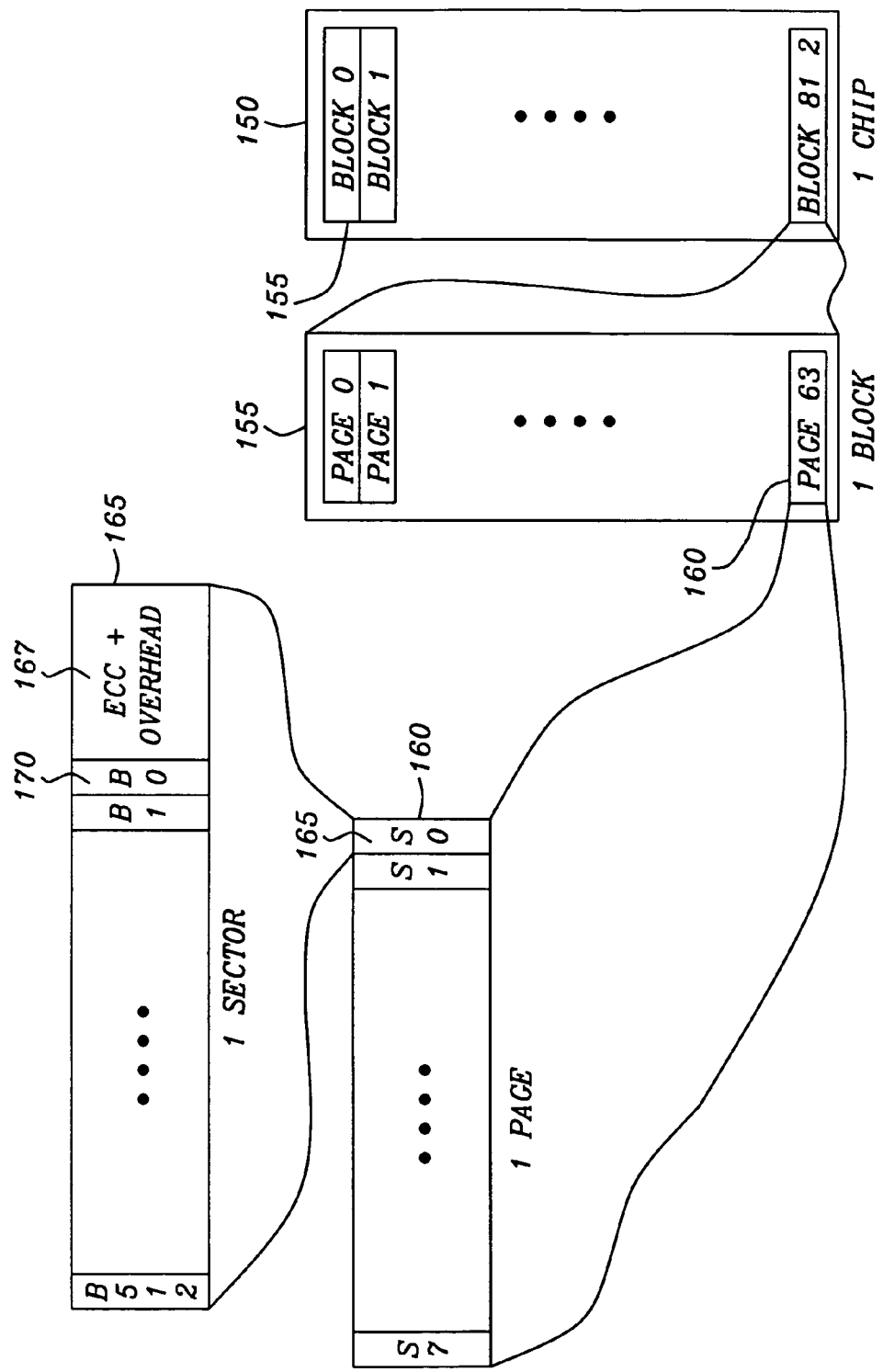
FIG. 1b – Prior Art

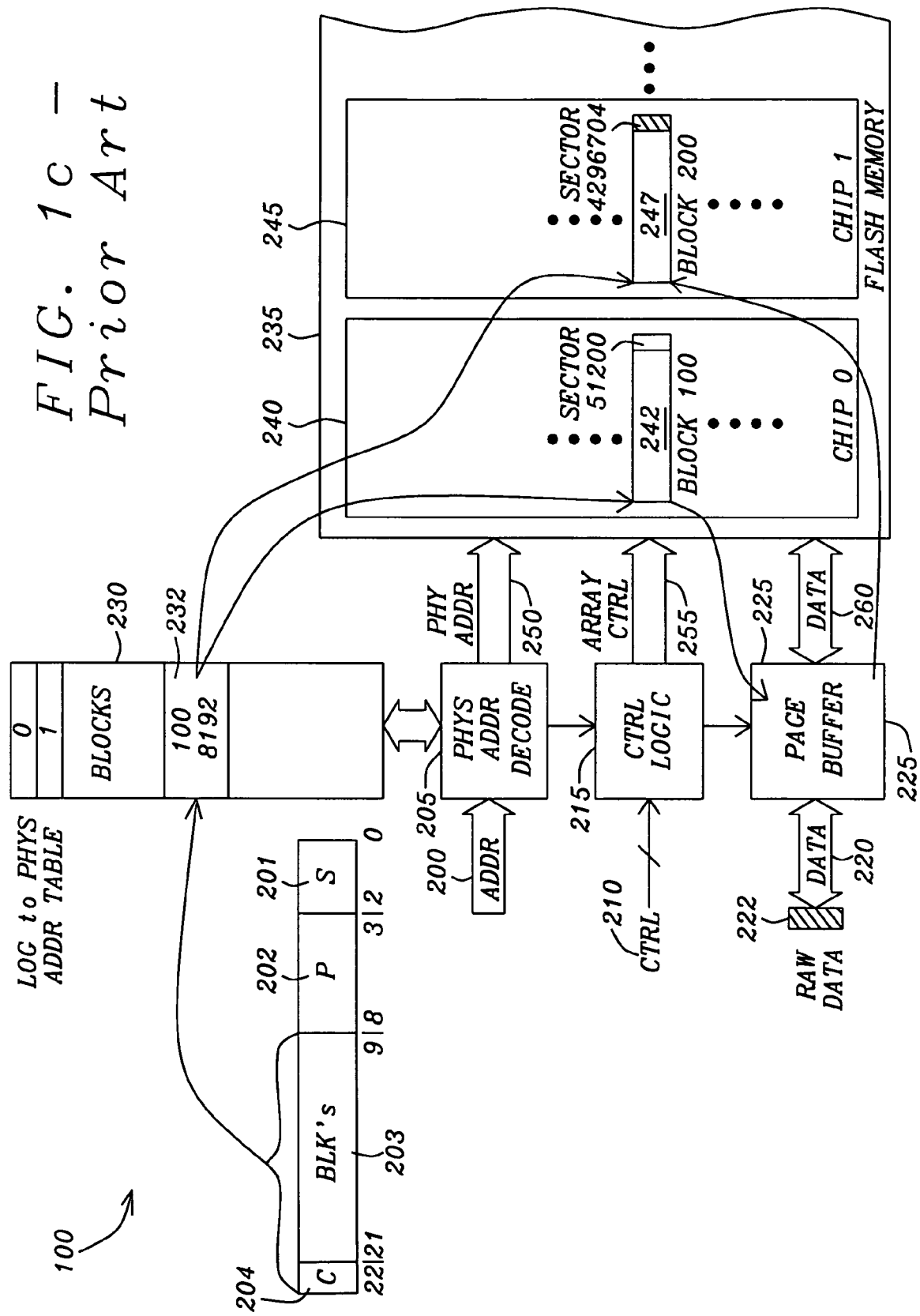
FIG. 1c – Prior Art

PAGE BASED MANAGEMENT OF FLASH STORAGE

BACKGROUND OF THE INVENTION

1. Field of the Invention

This invention relates generally to memory management systems and methods. More particularly, this invention relates to memory management circuits and methods for management of nonvolatile memory devices. Even more particularly, this invention relates to page based memory management of nonvolatile memory devices such as Flash Random Access Memory (RAM).

2. Description of Related Art

A solid-state drive (SSD) is a data storage device that uses semiconductor memory devices to store persistent data. An SSD is used to emulate a magnetic or electro-optical hard disk drive. The SSD employs an interface such as the Serial Advanced Technology Attachment (SATA) that allows the SSD to easily replace a hard disk drive in most applications. Other interface formats that may used by the SSD include Parallel Advanced Technology Attachment (PATA), Universal Serial Bus (USB), Peripheral Component Interconnect Express (PCI express), fiber channel (ANSI X3.230-1994, Fiber Channel—Physical and Signaling Interface). SSD systems may use volatile RAM such as static RAM or Dynamic RAM or nonvolatile RAM such as Flash RAM.

Refer now to FIG. 1a for a discussion of a computer system employing an SSD 100 to replace hard disk drive for persistent data. A central processing unit 105 executes a sequence of stored program instructions that are retained in temporary computer memory (RAM) 110 or the persistent memory (SSD) 100. The central processing unit executes four basic functions: a fetch for an instruction and or data from the temporary memory 110 or the persistent memory 100, decode of the instruction data, execution of the instruction, and write back of the result to the temporary memory 110 or the persistent memory 100. The fetch or write back of the resulting data may additionally be a communication with an input/output device 115 such as a printer, display or a network device.

The CPU 105, the temporary memory 110, the persistent memory 100, and the Input/Output device 115 are connected to a system bus 120. The system bus 120 provides the necessary data formatting and conversion for communication between the CPU 105, the temporary memory 110, the persistent memory 100, and the Input/Output device 115. In the example of the persistent memory 100, the system bus provides the communication in a format such as an SATA format or the other formats listed above. The formats such as the SATA format contain the configuration for the logical address within the persistent memory 100, the data, and control information for the fetching and storing of program instructions and data for processing by the CPU 105.

The persistent memory 100 as implemented as an SSD 100 has a controller 125 that decodes the logical address to a physical address and the control information for determining whether the data is to be stored or fetched from the NAND Flash array 130. The NAND Flash array 130 includes nonvolatile memory flash RAM chips that are divided into a number of blocks (for ex. 8192 for a 16 gbit chip). Each block is subdivided into pages (64 pages per block for Single Level memory Cell chips (SLC) or 128 pages for Multi-Level memory Cell chips). The structure of a NAND flash memory chip does not permit reading and writing in a byte per byte basis but can only be accomplished in chunks of one page (typically 4 kb). Additionally, an already written page cannot be overwritten. Writing can only be done to erased pages. The erase unit is a block, 64 or 128 pages. The different unit size for read/write (1 page) and erase (64/128 pages) makes management of flash RAM chips difficult. This also means random write of small chunks of data is quite slow, because blocks must be erased and data of the old block must be copied before writing. A logical-to-physical (LogToPhys) translation table is needed to provide a physical location of data for a given logical address. The logical-to-physical (LogToPhys) translation table is located in the flash memory and must be changed each time the data is to be written.

FIG. 1b illustrates the logical address structure for a flash storage system SSD 100 of the prior art. In this example, a flash RAM nonvolatile memory device 150 is divided into blocks 155 (8192 Blocks). Each block 155 is divided into pages 160 (64 pages) and each page 160 is divided into sectors 165 (8 sectors). Each of the sectors 165 is divided into bytes 170 (generally 512 bytes). The sector is normally defined as the smallest unit to be covered by ECC and any required overhead bits 167. As technology is advancing the sector and the page may actually become equal at 4K Bytes (512 Bytes×8 sectors).

Consumer oriented flash storage cards are very price sensitive. Controllers for flash storage cards are generally single chip items with a minimal number of external components and no external RAM memory. If the controller of a flash storage card has internal amount of RAM memory, it is very limited. In order to conserve RAM space, it is state of the art for these controllers to use a block oriented management process. This means an entry within the logical-to-physical (LogToPhys) translation table is a block number. A block address covers a large amount of data, typically 256 Kb or 512 Kb, this table changes slowly while writing sequentially.

FIG. 1c illustrates an exemplary flash storage system SSD 100 of the prior art. An address signal 200 is applied to a physical address decode circuit 205. The physical address is structured to have lower order bits (0 . . . 2) are designated as pointing to sectors 201 within a page. The next higher order bits (3 . . . 8) are designated as pointing to the pages 202 within a block. The next higher order bits (9 . . . 21) are designated as pointing to the block 203. The highest order bit (22) is designated as pointing to the chip location 204.

In this example the array of Flash RAM nonvolatile memory devices 235 consists of at least two Flash RAM nonvolatile memory chips 240 and 245. The physical address decode circuit 205 generates a physical address 250 that identifies the blocks 242 and 247 within the two Flash RAM nonvolatile memory chips 240 and 245 that are to be access for reading or writing of data 220.

A control signal 210 provides the encoded control word that is sent to the control logic 215 to develop the control signals 270 for the array of Flash RAM nonvolatile memory devices 235 for reading or writing of data to the two Flash RAM nonvolatile memory chips 240 and 245. Input Data signals 220 provide the new sector data 222 that is to be read from or written to the array of Flash RAM nonvolatile memory devices 235. The Data signals 220 are retained by the page buffer 225 until they are to be read to external host circuitry or written to the array of Flash RAM nonvolatile memory devices 235. The data is transmitted on a data bus 260 between the page buffer and the array of Flash RAM nonvolatile memory devices 235.

As is known in the art, the SATA interface provides addressing for reading or writing sectors of a magnetic or electro-optical hard drive. To be compatible with the magnetic or electro-optical hard drive operation, an SSD must also operate at a sector level to communicate with an SATA interface. The example, as shown in FIG. 1c, illustrates an update of a single sector having a logical block address (LBA) 51200. The low order bits (0 . . . 8) for the sector 201 and the page 202 are the same for the logical and physical address and represent the sector position within a block 203. The high order bits (9 . . . 22) 203 and 204 of the logical address are an index into a logical-to-physical table 230. The logical-to-physical table 230 has as many entries 232 as there are blocks. In each entry 232, the highest order bit indicates, physically, which of the two Flash RAM nonvolatile memory chips 240 and 245 are to be accessed for reading, writing, or erasing. The low order bits of the entry 232 indicate the physical block number within one of the two Flash RAM nonvolatile memory chips 240 and 245. In this example, the data that is resident block 100 242 in the Flash RAM nonvolatile memory chip (0) 240 is replaced with the erased block 200 247 of the Flash RAM nonvolatile memory chip (1) 245. The block 200 247 is to receive the new sector data 222 from the external circuits. All other sectors of the block 100 242 are copied from the old block 100 242. This copy operation is referred to as block recombination.

To accomplish this update, the address 200 is decoded by the physical address decoder 205 and the high order bits (9 . . . 22) are used to point to the index address to the logical-to-physical table 230. The physical address for the block 100 242 is transmitted to the array of Flash RAM nonvolatile memory devices 235. At this same time the control logic 215 receives and decodes the control information and commands the physical address decoder 205 to transmit the address. Simultaneously, the control logic 215 sends the array control signals 270 to the array of Flash RAM nonvolatile memory devices 235. The Flash RAM nonvolatile memory chip 240 is instructed to read the data of the entire block 100 242 to the page buffer 225 on the data bus 260. The control logic 215 instructs the page buffer 225 to merge the new data 220 with the data read from the block 100 242 in the location of the sector 4296704 247. The control logic then determines that the data from block 100 242 is to written back to the block 200 247 of the Flash RAM nonvolatile memory chip (1) 245 and instructs the physical address decoder 205 to update the contents of the index of the logical-to-physical table 230 from the physical block 100 to the physical block 8392 (8192+200). The block buffer 225 is instructed to write the updated block to the block 200 247 with the new data in the sector 51200. The control logic then instructs the Flash RAM nonvolatile memory chip (0) 240 to erase the block 100.

The block based management, as described, is very fast for sequential operation, when whole blocks are completely overwritten with new data. However the process slows down for random write depending on the amount of block recombination overhead. Modern high capacity solid state drives (SSD) must compete with much cheaper mechanical hard disc drives (HDD). To be competitive, SSDs must be much faster than HDDs especially the random write speed. Therefore high speed is a much more important issue than controller price and these kinds of controllers usually have a big external DRAM to bring up speed considerably. What is needed to benefit from this new hardware architecture are a better internal methods and circuits for management of the array of Flash RAM nonvolatile memory devices 235.

"A Space-Efficient Flash Translation Layer for Compact Flash Systems", Kim, et al., IEEE Transactions on Consumer Electronics, May 2002, Vol.: 48, Issue: 2, pp: 366-375 describes an intermediate software layer called a flash translation layer (FTL) that is employed to redirect logical addresses from the host system to physical addresses in flash memory. A flash translation layer combines a page write and block erase granularities in address translation. A coarse grain address translation lowers the resources required to maintain translation information, and a fine grain address translation is efficient in handling small size writes.

U.S. Pat. No. 5,404,485 (Ban) provides a flash memory, virtual mapping system that allows data to be continuously written to unwritten physical address locations. The virtual memory map relates flash memory physical location addresses in order to track the location of data in the memory.

U.S. Pat. No. 5,963,983 (Sakakura, et al.) teaches a memory device having a work memory for storing logical address-physical address conversion information. The semiconductor memory device is addressed as predetermined sector units. The memory device has a data storage having a nonvolatile memory that can be electrically rewritten. An interface connected to the host computer system receives an access request. The volatile work memory stores a table of the page addresses of the nonvolatile memory for converting the requested logical sector address into a physical sector address among a physical memory space of the nonvolatile memory. A second table in the volatile work memory stores the addresses of blocks of pages, for converting a logical page numbers addressed by the access request the page numbers of the block in the nonvolatile memory. A second access control means refers to the second table retrieve logical sector address to acquire a corresponding physical page numbers for the block.

U.S. Pat. No. 6,591,328 (Iida, et al.) describes a non-volatile memory with a storing address control table data formed of logical addresses and physical addresses. The logical/physical address control table controls the location of data recorded discretely in the non-volatile memory. The logical/physical address control table is composed of a plurality of blocks each serving as a data deletion unit and including adjacent pages which each have a fixed length and serve as a data read/write unit. An operand data block includes operand identification data that indicates data stored in the operand data block is, in fact, operand data. The logical/physical control table block located in the non-volatile memory includes control-table identification data that indicates that data that is stored in the control table data that includes logical addresses and physical addresses.

U.S. Pat. No. 6,598,115 (Kaki, et al.) teaches a semiconductor storage apparatus that includes multiple nonvolatile flash memories and utilizing logical to physical sector conversion. A controller converts logical sector numbers for blocks of data into physical sector numbers of areas of nonvolatile flash semiconductor memories where the blocks of data are to be written.

U.S. Pat. No. 7,386,655 (Gorobets, et al.) provides a method with indexing for a scratch pad and update blocks in non-volatile memory. Update data is recorded selectively in at least two interleaving streams such as either into an update block or a scratch pad block depending on a predetermined condition. The scratch pad block is used to buffered update data that is ultimately destined for the update block in the nonvolatile.

U.S. Pat. No. 7,386,700 (Lasser) describes flash memory management system for a memory for accessing data from a host. The system includes physical units and virtual units of the memory and a mapping mechanism of each virtual unit into one or more physical units.

U.S. Patent Application 2006/0069852 (Aasheim, et al.) provides a free sector manager for data stored in flash memory devices. A flash driver tracks data stored in a flash memory device through the use of logical-to-physical sector mapping. The mapping is stored in a data structure and allows data to be written into the next free physical sector in the flash memory medium. Write operations complete quickly, because there is no need to perform an erase operation in order to write new data on to the flash memory medium. The logical-to-physical sector mapping stored in data structure is backed-up on the flash memory medium. In the event there is a catastrophic power interruption, logical-to-physical sector mapping can easily be reestablished by scanning the backed-up mapping in the flash memory medium.

SUMMARY OF THE INVENTION

An object of this invention is to provide a method and circuit for page based management of an array of Flash RAM nonvolatile memory devices.

Another object of this invention is to proved a method and apparatus for wearleveling with an array of Flash RAM nonvolatile memory devices.

To accomplish at least one of these objects a memory management circuit provides paged base reading and writing and block erasure of a flash storage system. The memory management system includes a management processor, a set of page buffers that are managed as a cache, and a logical-to-physical translation table. The management processor is in communication with an array of nonvolatile memory devices within the flash storage system to provide control signals for the programming of selected pages, erasing selected blocks, and reading selected pages of the array of nonvolatile memory devices.

The page buffer is in communication with the array of nonvolatile memory devices and the management processor. The page buffer is partitioned into page segments such that each page segment has a size equal to that of a page of the flash storage system. Each of the page segments temporarily store pages of data that are read from or to be transferred to the array of nonvolatile memory devices as determined by control signals received from the management processor. The logical-to-physical translation table receives a requested logical page address and provides an index for translating the logical page address to a physical page address. The logical-to-physical translation table is in communication with the management processor to transfer the physical page address to the management processor for identifying a physical location of a desired page within the array of nonvolatile memory devices. The logical-to-physical translation table comprises a cache flag table identifying if the requested logical page address is present in the page buffer.

The memory management circuit further includes an input/output adapter that is connected between an external port and the page buffer and the management processor. The input/output adapter receives the logical address, control, and sectors of data encoded in a communication format and translates the logical address, control, and data encoded in the communication format to a format acceptable by the array of nonvolatile memory devices.

A physical address decoder is included in the memory management circuit and is in communication with the input/output adapter to receive the logical address. The physical address decoder is in communication with the logical-to-physical translation table to transmit the logical address to the logical-to-physical translation table and receive the physical address from the logical-to-physical translation table. The physical address decoder provides the management processor with the identifying information that determines whether a requested page of data is resident in the page buffer or the array of nonvolatile memory devices.

A page buffer cache table is in communication the management processor. The page buffer cache table provides an entry for a physical page number identifying a physical location within the array of nonvolatile memory devices associated with a page location within the page buffer. A cache type entry designates a cache type occupied by the physical location. A validity entry classifies the sectors of the page of data according to a validity status. The cache types are a read cache, streaming cache, write cache, and free list. The free list provides a listing of the page buffers that are erased and available for use.

A least-recently-used table includes chaining pointers for determining a least recently used page of data resident in the page buffer. Each of the cache types (the read cache, the streaming cache, the write cache, and the free list) have chaining pointers determining the least recently used page of data assigned to that cache. During an eviction process of the page buffer by the management processor, the least recently used page of data resident in the page buffer is evicted from the page buffer and written to its designated page within the array of nonvolatile memory devices and the page location within the page buffer is added to the free list of the page buffer cache table.

The memory management circuit has an invalid page table that indicates which pages within a selected block of the array of nonvolatile memory devices are valid. A physical-to-logical table maps the physical location of the array of nonvolatile memory devices to the logical location. An illegal page number indicates that the physical location is erased or invalid.

An erase count table maintains an erase count for each block of the array of nonvolatile memory devices. A physical block chain table has a linked listing containing pointers for each block of the array of nonvolatile memory devices. The linked list provides an anchor pointer defining the number of invalid pages within each block of the array of nonvolatile memory devices. When the management processor executes a garbage collection process of the array of nonvolatile memory devices, the anchor pointer indicates the block of the array of nonvolatile memory devices having the highest number of invalid pages. The block with the highest number of invalid pages is then selected for garbage collection.

In a wearleveling process, an erased block has its erasure count compared to a sliding window that is a lowest block erasure count plus a block erasure count threshold. If the erased block count falls outside the sliding window is exceeded, a block having a lowest erased count is selected and all valid pages of the block with the lowest erase count are copied to the low order pages of the newly erased block. The block with the lowest erase count is erased, and its erasure count is incremented. It then becomes a new spare block available for writing.

BRIEF DESCRIPTION OF THE DRAWINGS

FIG. 1a is a block diagram of a computer system including a solid state drive of the prior art.

FIG. 1b is a diagram illustrating the addressing structure of the prior art.

FIG. 1c is a block diagram of a solid state drive employing block based memory management of the prior art.

DETAILED DESCRIPTION OF THE INVENTION

The page based management scheme of this invention decodes the address to index a logical-to-physical translation table to a page number within a block. The logical-to-physical translation table contains a cache residence bit to indicate if the page is resident in the page or must be retrieved from the array of Flash RAM nonvolatile memory devices.

If the page is not resident in the page buffer, it is fetched from the array of Flash RAM nonvolatile memory devices and placed in the page buffer. The sectors are read from or written to the page buffer as indicated by the low order address. If there are an insufficient amount of free pages within the page buffer, an eviction process evicts a least recently used page from the page buffer. If it is valid and is consistent with the page as stored in the array of Flash RAM nonvolatile memory devices, the page buffer page space is declared and the page is fetched from the array of Flash RAM nonvolatile memory devices. The sectors are read from or written to as appropriate. If there are sectors within the page that are invalid, the invalid sectors in the page buffer are newer and the matching sectors in the array of Flash RAM nonvolatile memory devices are outdated. The page is then rewritten to the array of Flash RAM nonvolatile memory devices and the location in the page buffer is declared a free page.

The newly free page within the page buffer is assigned to the addressed page and the page is read from the array of Flash RAM nonvolatile memory devices. The sectors are then read from or written to the page buffer.

A listing of erased blocks is maintained and when there are insufficient erased blocks to allow the operation of the array of Flash RAM nonvolatile memory devices, a garbage collection process is executed to erase invalid blocks. After a block is erased, its erase count is evaluated against a threshold. If the threshold is exceeded, a block with a lowest erase count has its contents copied to the newly erased block and the block with the lowest erase count is erased and becomes a spare block.

Figure 2:
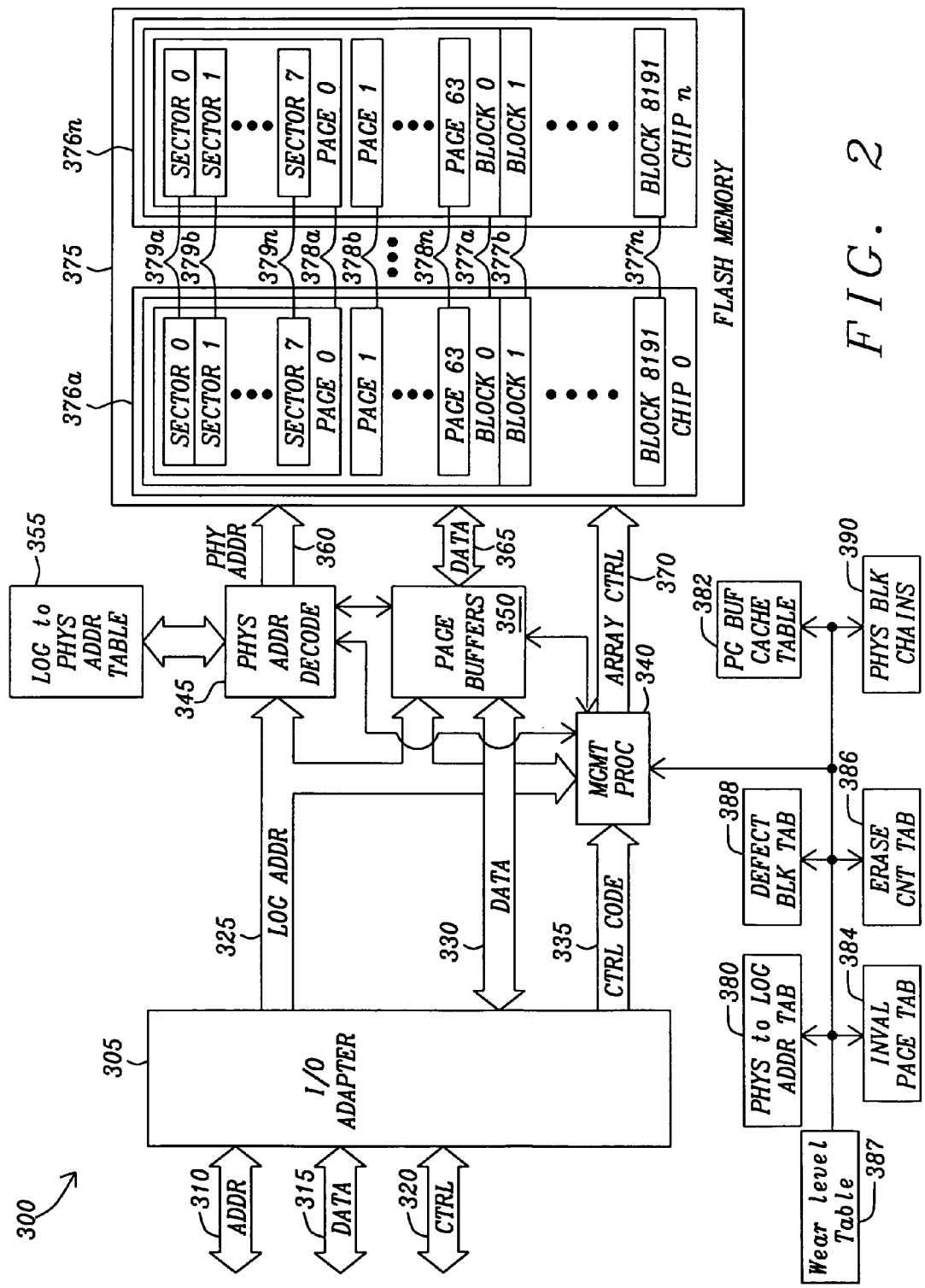
FIG. 2 is a block diagram of a solid state drive employing page based memory management of this invention.

FIG. 2 is a block diagram of a solid state drive data storage system employing page based memory management of this invention. Refer now to FIG. 2 for a discussion of the structure of the solid state drive data storage system 300 employing page based memory management of this invention. The array of Flash RAM nonvolatile memory devices 375 has multiple Flash RAM nonvolatile memory devices 376a, . . . , 376n. Each of the Flash RAM nonvolatile memory devices 376a, . . . , 376n are partitioned into blocks 377a, 377b, . . . , 377n and each of the blocks 377a, 377b, . . . , 377n are partitioned into pages 378a, 378b, . . . , 378n. Each of the pages 378a, 378b, . . . , 378n are partitioned into sectors 379a, 379b, . . . , 379n. The sizes are in the examples of the embodiments of this invention are 8192 blocks per chip, 64 pages per block, and 8 sectors per page. In a 128 G Byte solid state drive employing 16 G Flash RAM nonvolatile memory devices 375, there will be 64 Flash RAM nonvolatile memory devices 376a, . . . , 376n.

An Input/Output adapter 305 is connected to receive address signals 310, receive and transmit data signals 315, and receive control signals 320. While these signals are shown as individual signals, in an SATA interface these signals may actually be serially transmitted and received. The Input/Output adapter 305 will condition and format the signals to generate the logical address signal 325 for receipt by the physical address decoder 345 and the management processor 340. The data signals 330 are transferred after conditioning and formatting between the page buffer and the Input/Output adapter 330. The control code is also conditioned and formatted by the Input/Output adapter 340 for transmission to the management processor 340.

The physical address decoder 345 decodes the logical address signal 325 to generate an index into the logical-to-physical address translation table 355. The logical address index points to a location that contains the actual physical location that is to used in reading or writing to the array of Flash RAM nonvolatile memory devices 375. The management processor 340 decodes the control code 335 to generate the necessary control signals for the physical address decoder 345 and the page buffers 350, and array control and timing signals 370 for the array of Flash RAM nonvolatile memory devices 375.

The management processor 340 uses a physical-to-logical address table 380, a page buffer cache table 382, an invalid page table 384, an erase count table 386, a wearlevel table 387 a defective block table 388, and a physical block chains table 390 to manage the consistency of the data between the array of Flash RAM nonvolatile memory devices 375 and the page buffers 350.

The physical-to-logical address table 380 is indexed by a physical page number. The physical-to-logical address table 380 performs an inverse function to logical-to-physical address translation table 355 and is used by the management processor 340 for garbage collection and wearleveling (as discussed hereinafter). The two highest entries (0xffffffff, 0xfffffffe) are reserved and have a special meaning that the physical page identified is not associated with a logical page number: 0xffffffff means the this physical page is erased and 0xfffffffe means this physical page is invalid. Logical pages that were never written have no physical page number. This is the initialization of logical-to-physical address translation table 355 after low level format. If such a page is read, the management processor 340 generates 0xffffffff data in the page buffers 350. 0xffffffff data is the contents of an erased page 378a, 378b, . . . , 378n within the Flash RAM nonvolatile memory devices 375.

With these special codes, there is no need for an Invalid Page Table except for recovery. When a block is erased, all pages for this block have a 0xffffffff value in the physical-to-logical address table 380. To determine the number of invalid pages in a block, the number pages with a 0xfffffffe values in the physical-to-logical address table 380 is counted. The physical-to-logical address table 380 is initialized with all pages of all erased blocks, active write blocks and defective blocks have the 0xffffffff value entered and all other pages have the 0xfffffffe entered. The logical-to-physical address translation table 355 is then scanned to place the logical locations of the physical pages in the physical-to-logical address table 380.

Figure 5:
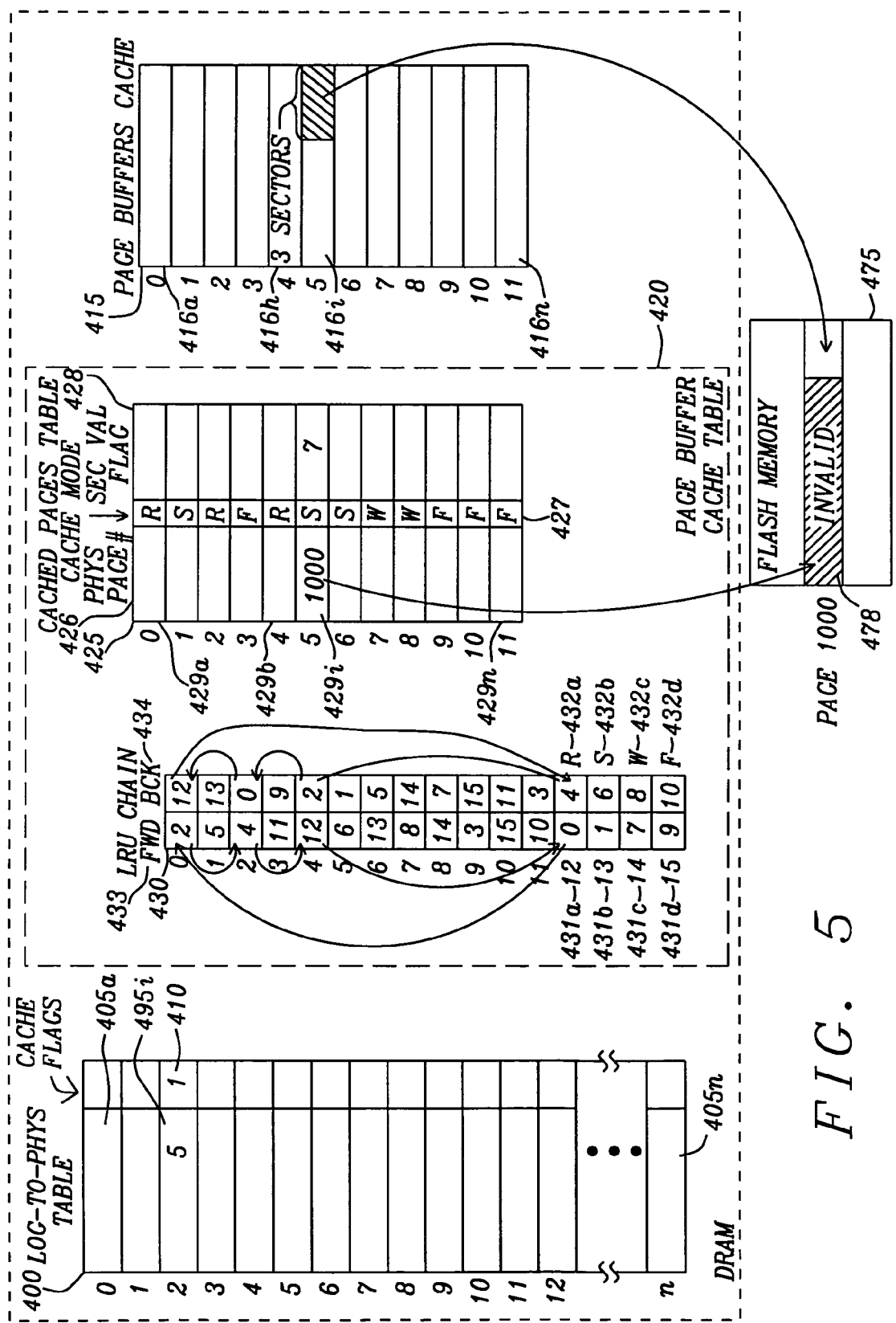
FIG. 5 is a block diagram of tables employed in the page based memory management of this invention.

The page buffer cache table 382, as shown in FIG. 5, contains the same number of entries as there are page buffers 350. The page buffer cache table 382 is further divided into a cached pages table and a least-recently-used page chain table. Every page buffer cache table 382 entry corresponds to one page buffer and describes a cache status each of the page buffer 350. All page buffer cache table 382 entries are linked to the four caches: the read cache, the write cache, the streaming, and the free list with a least recently used ordering. Each of the page buffers 350 are designated as belonging to exactly one cache. Further the cached pages entry identifies that the corresponding page buffer 350 is either dirty, or not dirty, or unused (free). The page buffer cache table 382 is indexed by the logical page number if the cache present bit in the cached pages table 425 is set. If the cache present bit in the cached pages table 425 is not set, there is no page buffer 350 location available in page buffers 350 for this logical page number.

The page buffer cache table 382 has an entry that contains the physical page number pointing to the flash location of this page. This information is necessary to set this page invalid, after evicting the page from the cache buffers 350 and writing it to another location in the cache buffers 350. Alternately, the data resident in the Flash RAM nonvolatile memory devices 375 is read from the page location of the Flash RAM nonvolatile memory devices 375, in case not all sectors in the cached page buffer in the cache buffers 350 are valid.

The cached pages table 425 is indexed by the physical page number 429*a*, ..., 429*m* of the page buffer 350 and contains the physical address for the page 378*a*, 378*b*, ..., 378*n* within the array of Flash RAM nonvolatile memory devices 375 for the data resident in the page buffer 350 and the index address. A cache mode designator defines whether the page is in one of four cache types: a free list, a read cache, a streaming cache, and a write cache. The cached pages table 425 also has a valid sectors bitmap 428 that provides an indicator of which sectors of a page are invalid.

The read cache contains pages that are not dirty. The contents of a cache are considered not dirty when the data resident in the page buffers 350 and data resident in the Flash RAM nonvolatile memory devices 375 are identical. The data resident in the page buffers 350 does have to be written back to the Flash RAM nonvolatile memory devices 375 for eviction data resident in a page buffer 350 location from the read cache. All user pages 378*a*, 378*b*, ..., 378*n* that are read from Flash RAM nonvolatile memory devices 375 flow through the read cache.

The streaming cache contains dirty pages that must be written back to the Flash RAM nonvolatile memory devices 375 for eviction, because the data resident in the page buffers 350 contains newer information than data resident in the page 378*a*, 378*b*, ..., 378*n* of the Flash RAM nonvolatile memory devices 375. All data that is received from external host circuitry flows through the streaming cache. If a page location is already in read cache, the data resident read cache is deleted from the read cache and moved to the write cache. If a page in streaming cache is touched a second time by read or write command, it is promoted to write cache.

The write cache contains dirty pages that have touched at least twice. The streaming cache and the write cache provide a more efficient eviction strategy. The write cache is effectively divided into two parts. The streaming cache for pages that are only written once. The write cache is for pages that are written more than once (for example: file allocation tables are updated very often). This is to avoid invalidating the whole write cache because of useless write once data. Every page in the streaming cache gets a chance to get promoted to write cache. If data resident in the streaming cache remains in streaming cache, the data is evicted earlier.

The free list provides a pool of free page buffers 350. Whenever there is a read/write command from the external host circuitry to a page location of the data resident in Flash RAM nonvolatile memory devices 375 that is not found in page buffer cache, a new cache entry is needed. In order to respond quickly, the management processor 340 tries to keep a pool of free page buffers 350. If the number of free page buffers 350 becomes too low, there is a message to the eviction thread to start running and generating new free page buffers 350.

The partitioning between the read cache, the write cache, the streaming cache, and the free list may be changed dynamically. For example: the write cache may grow at the expense of read cache, depending on actual workload and a ratio between read and write commands.

The least-recently-used page chain table 430 provides a chained entry mechanism that allows a search of the table to find a page within the page buffers 350 that has not been access recently. This is used in a page eviction process from the page buffers 350 to free space in the page buffers 350. In the eviction process, a garbage collection process and a wear-leveling process is used to write pages of data to array of Flash RAM nonvolatile memory devices 375 and erase blocks of the array of Flash RAM nonvolatile memory devices 375. As the eviction process causes the writing of pages of data to the array of Flash RAM nonvolatile memory devices 375 it triggers garbage collection, because it consumes too many erased pages and the number of erased blocks becomes too low. The new erased blocks are generated by garbage collection. Garbage collection is a two step process, prepare a block for erasure by copying all valid pages, and erase the block thereafter. After block erasure, a block erase count is increased. If the block erase count is too high, the block is exchanged with a block having a very low erase count. An example of a block with a very low erase count is a block that contains read data which is not erased often.

The invalid page table 384 is a table that has one bit for each page of a block (64 Bits per block assuming 64 pages per block). When a bit for a given page within a block is a logical one, it means, this page is invalid in this example. An invalid page is obsolete, but not erased and is no longer used because it has been superseded by newer page. The invalid page table 384 is only necessary for a recovery algorithm where if the physical-to-logical address table 380 (which is written last at power-down) is not readable at power-up, it may be reconstructed by reading all pages. The logical page number is stored in the overhead area of every page as a back pointer. The problem is that this back pointer is not unique, because the obsolete pages may still be available and not yet erased. The invalid page table 384, which is stored to flash earlier, defines which pages are valid. The invalid page table 384 is used internally for other purposes for convenience only. It could be skipped, if the recovery algorithm was not necessary.

The erase count table 386 is used during wearleveling to monitor the erase count of all blocks. The erase counts are within a sliding window of a minimum erase count plus a threshold. The minimum erase count is the actual lowest erase count of all blocks.

The wearleveling process takes place after erasing a block of the array of Flash RAM nonvolatile memory devices 375 and increasing the block's erase count in the erase count table 380. If the erase count is sufficiently large, the newly erased block has all the valid pages from a block having a minimum erase count copied to it. The block with the minimum erase count is erased. The invalid pages of the block with the minimum erase count are not copied and the corresponding pages are erased pages in the newly erased block into which the pages are copied. The block is not designated as the write block and has to be logged to the wearlevel table 387 indicating that there are erased pages resident in the block.

The defect block table 388 contains a bit representing each block of the array of Flash RAM nonvolatile memory devices 375. This defines whether a block is defective at manufacture or becomes defective and not usable.

The physical block chains table 390 is a double linked list with entries representing each block of the array of Flash RAM nonvolatile memory devices 375 with a number of anchor entries equal to the number of pages in a block (64 in this example). There are two additional anchor entries: one representing erased blocks and one pointing to a block that is a candidate for wearleveling. The block entries point to the anchor entry indicating an invalid page count for the block and the anchor entry has a listing pointing back to the block. The anchor entries may have multiple entries dependent on the number of invalid pages in each block. Each time a block gets an additional invalid page, a bit is set within the physical-to-logical address table 380. The block is unchained from anchor chain and chained into the next higher anchor chain. The physical block chains table 390 permit the garbage collection process to operate efficiently by quickly finding a block with the highest number of invalid pages. This minimizes the amount of copying of pages before erasing a block generate a free block for writing of pages to the array of Flash RAM nonvolatile memory devices 375.

Figure 3:
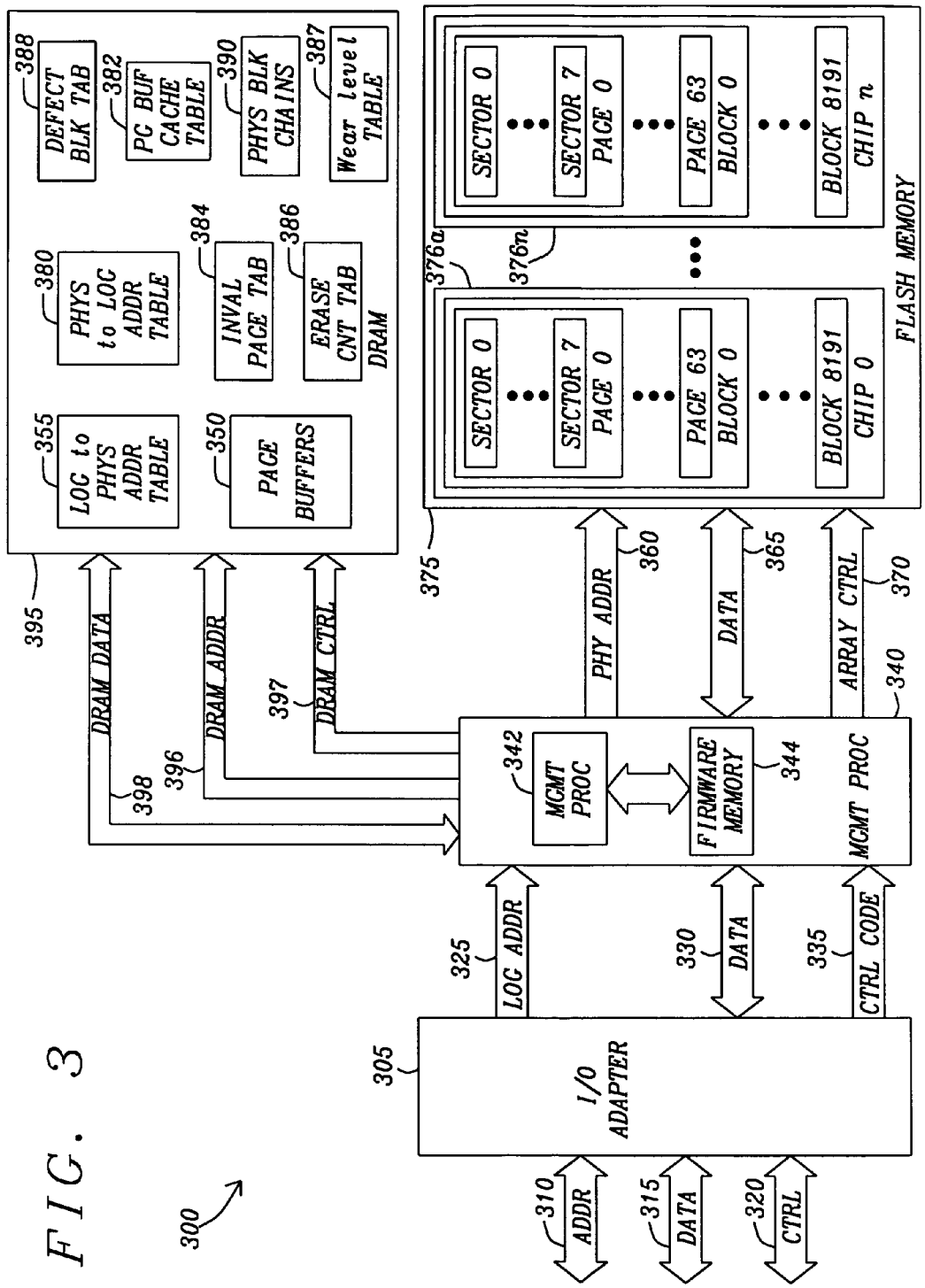
FIG. 3 is a block diagram of a physical implementation of a solid state drive employing page based memory management of this invention.

Refer to FIG. 3 for a description of a physical implementation of an embodiment of a solid state drive employing page based memory management of this invention. The functional structure is identical that of FIG. 2, except the physical address decoder 345 of FIG. 2 is incorporated into the management processor 340. The logical address 325, the data signals 330, and the control code 335 are applied to the management processor 340. The management processor 340 includes a management process controller 342 and a firmware memory 344. The management process is controller 342 is a computer processor that performs a computer program process for managing the array of Flash RAM nonvolatile memory devices 375. The firmware memory 344 is a computer readable storage medium that retains the computer program code that, when executed, performs the computer program process for managing the array of Flash RAM nonvolatile memory devices 375. An array of DRAM devices 395 provides the storage space for the page buffers 350, the logical-to-physical address translation table 355, the page buffer cache table 382, the invalid page table 384, the erase count table 386, the wearlevel table 387, and the defective block table 388.

The management process controller 342 generates the necessary address signals 396 and control and timing signals 397 to store and fetch the necessary data from the array of DRAM devices 395. This data may in fact be the data signals to be read or written to the page buffers 350, the physical addresses within the array of Flash RAM nonvolatile memory devices 375, or the table information from the physical-to-logical address table 380, the page buffer cache table 382, the invalid page table 384, the erase count table 386, the defective block table 388, the wearlevel table 387, and the physical block chains table 390.

Figure 4:
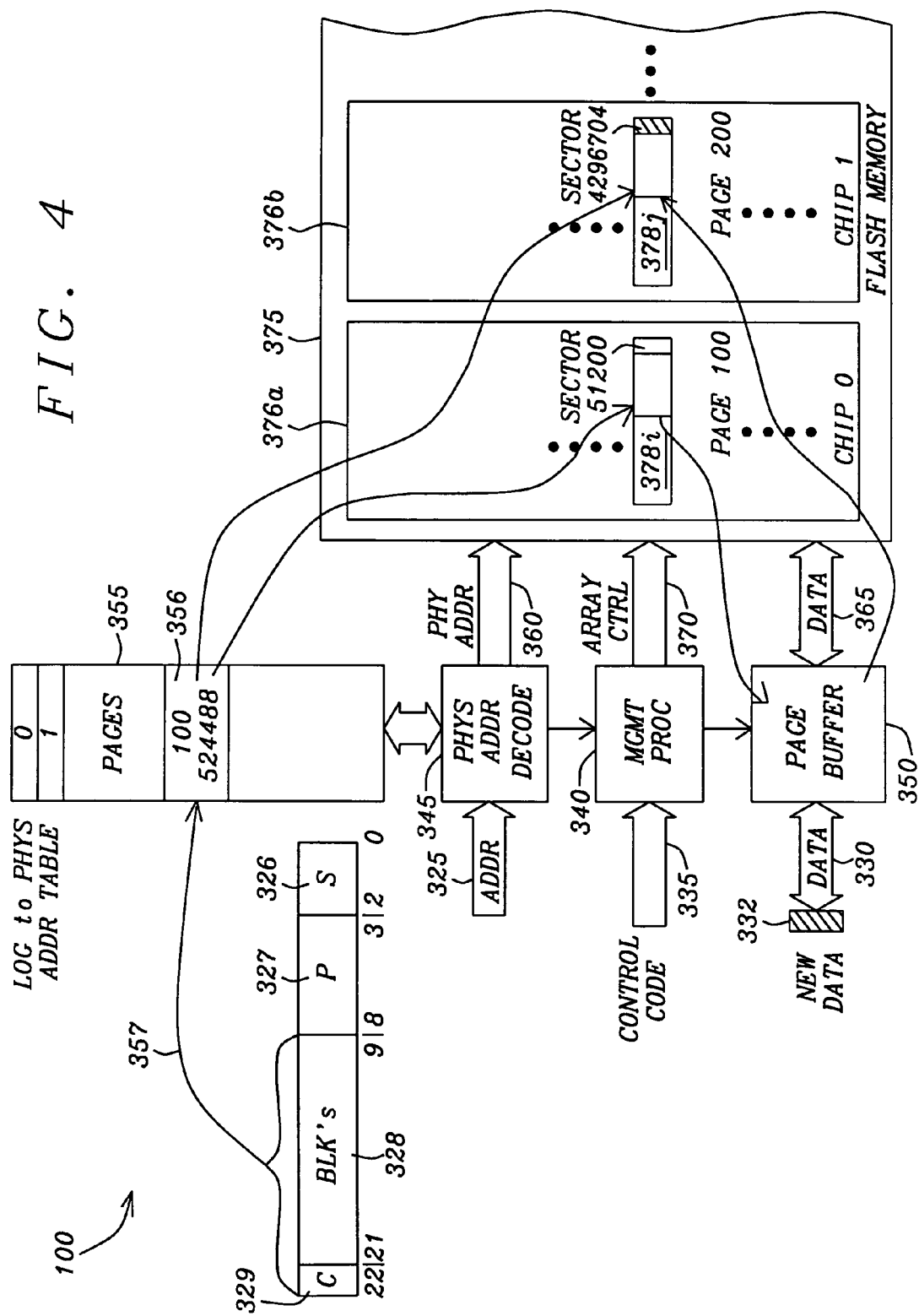
FIG. 4 is a block diagram of a physical implementation of a solid state drive employing page based memory management of this invention illustrating a read operation and a write operation.

Refer now FIG. 4 for a discussion of a physical implementation of a solid state drive employing page based memory management of this invention to illustrate a reading or write operation. An address signal 325 is applied to a physical address decode circuit 345. The physical address is structured to have lower order bits (0 . . . 2) that are designated as pointing to sectors 326 within a page. The next higher order bits (3 . . . 8) are designated as pointing to the pages 327 within a block. The next higher order bits (9 . . . 21) are designated as pointing to the block 328. The highest order bit (22) is designated as pointing to the chip location 329.

The management processor 340 receives the control code 335 requesting that data to be read from or written to the array of Flash RAM nonvolatile memory devices 375. The physical address decoder 345 transfers the most significant bits (3, . . . , 22) of the address signal 325 to the logical-to-physical address translation table 355 to act as an index 357 into the logical-to-physical address translation table 355. The contents of the location 356 stores the physical address (100) of the page. If the location 356 the logical-to-physical address translation table 355 indicates that the data is cached, the location contains the page location within the page buffers 350. The management processor 340 checks the cached pages table 425 to check that all sectors of the page location are valid. If they are not valid, the data for the invalid sectors are read from the Flash RAM nonvolatile memory devices 375 to the page location and the validity bits in the cached pages table 420 are set to valid. If the location 356 of the logical-to-physical address translation table 355 indicates that the data is not cached, the location contains the actual page location within the array of Flash RAM nonvolatile memory devices 375.

If the location 356 of the logical-to-physical address translation table 355 indicates that the data is cached, the management processor 340 instructs the page buffers 350 to transfer the data 330 to or from the input/output adapter 305 of FIG. 2. If the location 356 of the logical-to-physical address translation table 355 indicates that the data is not cached, the management processor 340 instructs the physical address decoder 345 to transfer the contents of the location 356 from the logical-to-physical address translation table 355 as the physical address signal 360 to the array of Flash RAM nonvolatile memory devices 375. The management processor 340 also transfers the array control signals 370 to the array of Flash RAM nonvolatile memory devices 375. The page 378*i* at the location (Page 100) is transferred to the page buffers 350. The management processor 340 instructs the physical address decoder 345 to write the page location in the page buffers 350 into the logical-to-physical address translation table 355 at the location 356. The management processor 340 further sets the validity bits of the cached pages table 420.

The management processor 340 retrieves the sector address 326 from the physical address decoder 345 and transfers it to the page buffers 350. If the data is to be read from the array of Flash RAM nonvolatile memory devices 375, the page buffers 350 retrieves the sector pointed by the sector address 326 and transmits it as the data signal 330. If the data is to be written, the management processor 340 instructs the page buffers 350 to write the new data 332 to the page location.

Subsequently, in an eviction process, the page will be removed from the page buffers 350. The management processor 340 assigns a new page address for a page location 378j in another chip 376b as a new location for the page of data. The management processor 340 instructs the physical address decoder 345 to write the new physical address 376j (page 100 becomes page 524488) to the logical-to-physical address translation table 355 at the location 356 that is pointed to by the page address portion (327, 328, and 329) of the logical address signal 325. The page of data is written from the page buffers 350 to the new location 378j (524488 or page 200 of the second chip 376b). The old location 378i (location 100 of the first chip) is then marked for erasure in a garbage collection process (explained herein after).

FIG. 5 illustrates tables employed in the page based memory management of this invention. In current technology, Flash RAM nonvolatile memory devices 415 have a density of 16 G memory cells or bits. That is equivalent to 2 G bytes or 524,288 pages or 8,192 blocks. In an embodiment of this invention, each of the Flash RAM nonvolatile memory devices 475 have 4 k Byte pages and a 1, 2, or 4-plane architecture. One page from each plane is combined into one page buffer 415 location. For example, in Flash RAM nonvolatile memory devices 475 with a 4 k Byte page and a 2-plane architecture, Each location 416 within the page buffer 415 has 8K Bytes. Simulation of the architecture of an SSD system of this invention suggests that the size of the page buffer 415 plus all other tables should be approximately 0.1% of the total size of the array of Flash RAM nonvolatile memory devices 375. In fact, the logical-to-physical address translation table 400 and physical-to-logical address table 445 are the largest portion of all DRAM. Therefore, a 128 G Byte array of Flash RAM nonvolatile memory devices 375 should have 128 M Byte of DRAM. For each of the Flash RAM nonvolatile memory devices 475, there are approximately 512 pages. This translates to the page buffer 415 having a size of approximately 16 M Bytes for the entire array of Flash RAM nonvolatile memory devices 475.

The logical-to-physical address translation table 400 has as many entry page locations 405a, ..., 405i, ..., 405n as the logical memory space of the SSD. As shown in FIG. 4, the logical-to-physical address translation table 400 is indexed by the page address 357. Each entry locations 405a, ..., 405i, ..., 405n of the logical-to-physical address translation table 400 contains the physical page location 478 within the Flash RAM nonvolatile memory devices 475 or the cached location for the page of data in the page buffer cache 415. The cache flag 410 for each of the entry locations 405a, ..., 405i, ..., 405n is appended to each of the entry locations 405a, ..., 405i, ..., 405n. The cache flag 410 designates whether the entry locations 405a, ..., 405i, ..., 405n are physically located in the page buffer cache 415 or in the array of Flash RAM nonvolatile memory devices 475.

The page buffer cache 415 provides a temporary fast access for pages of data that is stored in the Flash RAM nonvolatile memory devices 475. Data is either read from or written to the page buffer cache 415 from external host circuitry. The Flash RAM nonvolatile memory devices 475 are not directly accessed from the external host circuitry. The page buffer cache 415 has an associated page buffer cache table 420. The page buffer cache table 420 includes a cached pages table 425 with an entry location 429a, ..., 429i, ..., 429m corresponding to each page location 416a, ..., 416i, ..., 416m within the page buffer cache 415. Each entry location 429a, ..., 429i, ..., 429m of the cached pages table 425 has the physical page location 426, a cache mode flag 427, and a sector valid flag 428. The physical page location 426 provides the physical address within the Flash RAM nonvolatile memory devices 475 of the page stored in the page buffer cache 415.

The cache mode flag 427 indicates whether the page of data resident in the page buffer cache 415 is a member of a read cache, a streaming cache, a write cache, or a free list. As described above, the read cache is data that has been retrieved from the Flash RAM nonvolatile memory devices 475 and remains identical to the page locations of the Flash RAM nonvolatile memory devices 475. The write cache is has external data written to the page locations 416a, ..., 416i, ..., 416m and is therefore is no longer identical to the page locations of the Flash RAM nonvolatile memory devices 475 until the data is written back to the Flash RAM nonvolatile memory devices 475 during an eviction process. The streaming cache contains dirty pages that must be written back to flash for eviction, because page buffer in cache contains newer information than page in flash. The free list is not really a cache, but a listing of unoccupied locations within the page buffer cache 415 that are available for holding new pages retrieved from the page buffer cache 415 or new data pages to be written to the Flash RAM nonvolatile memory devices 475 from the external host circuitry.

The sector valid flag 428 provides a byte of data which indicates whether each sectors of a page are valid or invalid. The sectors are only valid in the Flash RAM nonvolatile memory devices 475 and must be retrieved from the Flash RAM nonvolatile memory devices 475 if needed The number of bits in the sector valid flag 428 is dependent on the definition of the number of sectors present in a page. For the present embodiment, as described above, the system is defined as having eight (8) sectors per page or eight (8) bits for each sector valid flag 428. In some embodiments, the page may be defined as having 8K Bytes (512 Bytes×16 sectors) or having sixteen (16) bits for each sector valid flag 428. In other embodiment, the sector and page may be equal and the sector valid flag 428 is unnecessary.

Also, included in the page buffer cache table 420 is a least recently used chain table 430. The least recently used chain table 430 has entries that match each entry location 429a, ..., 429i, ..., 429m of the cached pages table 425. The least recently used chain table 430 has chaining queues 433 and 434. The forward chaining queue 433 is ordered from the youngest entry to the oldest entry and the backward chaining queue 434 is ordered from the oldest entry to the youngest entry. Additionally, the least recently used chain table 430 has four (4) anchor entries 431a, 431b, 431c, 431d, 432a, 432b, 432c, 432d for each of the chaining queues 433 and 434. This allows the least recently used chain table 430 to have four (4) queues, one each for the read cache, the streaming cache, the write cache, and the free list within the chaining queues 433 and 434. These anchor entries 431a, 431b, 431c, 431d, 432a, 432b, 432c, 432d for each of the chaining queues 433 and 434 are the starting points for each these four queues for the forward chaining queue 433 and the backward chaining queue 434. The least recently used chain table 430 links all entries of the queues for the read cache, the streaming cache, and the write cache according their age. No ordering is necessary for the free list. This double linked list is also convenient for efficient Chain In/Chain Out operations, because the successors, predecessors are immediately available.

The aging mechanism for the least recently used chain table 430 functions such that every time a location within the page buffers 415 is touched, its entry in the least recently used chain table 430 moves to the beginning of the forward list (if it is not already there). So every entry that was nearer to the beginning of forward list, falls back by one entry. So the beginning of the forward list identifies the youngest entry.

Similarly, the last entry location of the forward list is equivalent to the beginning of backward list and marks the oldest (least recently used) entry.

If an input address has a logical address that points to the location 405i of the logical-to-physical address translation table 400, the contents point to a page location 5. The cache flag 410 for the location 405i indicates that the page location 5 pointed to by location 405i is in the page buffer cache 415. The physical page location 426 in the page buffer cache table 420 for location 5 points to the physical page 1000 in the Flash RAM nonvolatile memory devices 475. The sector valid flag 428 for page 5 in location entry 429i contains a value (7) that indicates that all but the three lowest order sectors of the page at the location 416i are invalid. Those three lowest order sectors are stored in the physical page 1000 in the Flash RAM nonvolatile memory devices 475.

In the reading and writing of data from and to the SSD, those pages that are not present in the page buffer cache 415 must be assigned a page from the free list as labeled by the cache mode flag 427. If the number of free pages in the page buffer cache 415 falls be below a threshold value, an eviction process is executed to remove those pages that are the least recently used of the pages. The least recently used chain table 430 provides a mechanism to evict a page out of the page buffer cache 415. As described above, the page buffer locations 416a, ..., 416i, ..., 416n resident are classified as being members of the read cache, the streaming cache, the write cache, or the free list.

All page buffer locations 416a, ..., 416i, ..., 416n in the streaming cache and the write cache are dirty and must be written back to the Flash RAM nonvolatile memory devices 475 sometime later. Locations within the page buffers 415 are termed dirty as the result of writing to the page buffers 415. Dirty page buffer 415 locations are members of write cache or streaming cache. The read cache pages are not considered dirty since they are just a copy of the a page location of the Flash RAM nonvolatile memory devices 475. Non-dirty pages are listed in the free list immediately. Dirty pages must be written back to the page location of the Flash RAM nonvolatile memory devices 475 before they are inserted in the free list to be reused directly.

Page buffer locations 416a, ..., 416i, ..., 416n that are found in the streaming cache during execution of another command (read or write) are promoted to write cache. If a page buffer locations 416a, ..., 416i, ..., 416n that is to be written to and is found in the read cache, it is promoted to write cache as well.

Each cache has a defined threshold value or standard fill rate that may change dynamically according workload. When the free list falls below its threshold level, the eviction process is started to provide free pages within the page buffer cache 415. The eviction process selects a page buffer location 416a, ..., 416i, ..., 416n for eviction that executes in two steps: select the cache by calculating the distance of its actual fill rate to its threshold. The cache that has a number of page buffer locations 416a, ..., 416i, ..., 416n that is most above its threshold will loose one page buffer location 416a, ..., 416i, ..., 416n. The page buffer location 416a, ..., 416i, ..., 416n that is to be evicted from the page buffer cache 415 is selected by searching the least recently used chain table 430 to find the oldest page buffer location 416a, ..., 416i, ..., 416n (least recently used) of the cache.

The least recently used chain table 430 is operated in parallel with the page buffer cache table 420 and page buffer cache 415. The aging of page buffer location 416a, ..., 416i, ..., 416n entries is done through re-linking the entries within least recently used chain table 430. For example, if the read cache is selected as being the cache having the largest distance from it fill rate threshold, the forward anchor entry 431a of the forward chaining queue 433 (location 12) points in the forward direction to the youngest entry (location 0) of page buffer cache 415. The backward anchor entries 433a of the backward chaining queue 434 (location 12) points in the backward direction to the oldest entry (location 4) of page buffer cache 415. The forward and backward chaining queues 433 and 434 are in reverse order: 0,2,4 and 4,2,0 for the read cache. Each time a page buffer location 416a, ..., 416i, ..., 416n is referenced, it becomes the youngest one (unchain it and reinsert again before the youngest one). That is, after referencing the page buffer location 416h (location 4), the forward and backward chaining queues 433 and 434 are reordered such that each queue has the forward anchor entry 431a that points to location 4 which in turn points to location 0, which points to location 2. The backward anchor entry 432a points to location 2 which in turn points to location 0, which points to location 4. Each entry of the least recently used chain table 430 are aged by moving its reference within each of the chaining queues 433 and 434 by one location within the queue.

As noted above, a page buffer location 416a, ..., 416i, ..., 416n that is to be evicted and is considered "dirty" must have its sectors copied to erased pages in the Flash RAM nonvolatile memory devices 415. The non-valid sectors are first from the Flash RAM nonvolatile memory devices 475 to the page buffer locations 416a, ..., 416i, ..., 416n. The full page is then copied to another location in an erased page of the Flash RAM nonvolatile memory devices 475. The logical-to-physical address translation table 400 is adjusted to reflect the new physical location within the Flash RAM nonvolatile memory devices 475. The previous page in the Flash RAM nonvolatile memory devices 475 that contained the sectors that had been non-valid in the page buffer locations 416a, ..., 416i, ..., 416n are now labeled as invalid, as described hereinafter. If the number of erased pages in a Flash RAM nonvolatile memory device 415 falls below a erased page threshold level, a garbage collection process is triggered.

Figure 6:
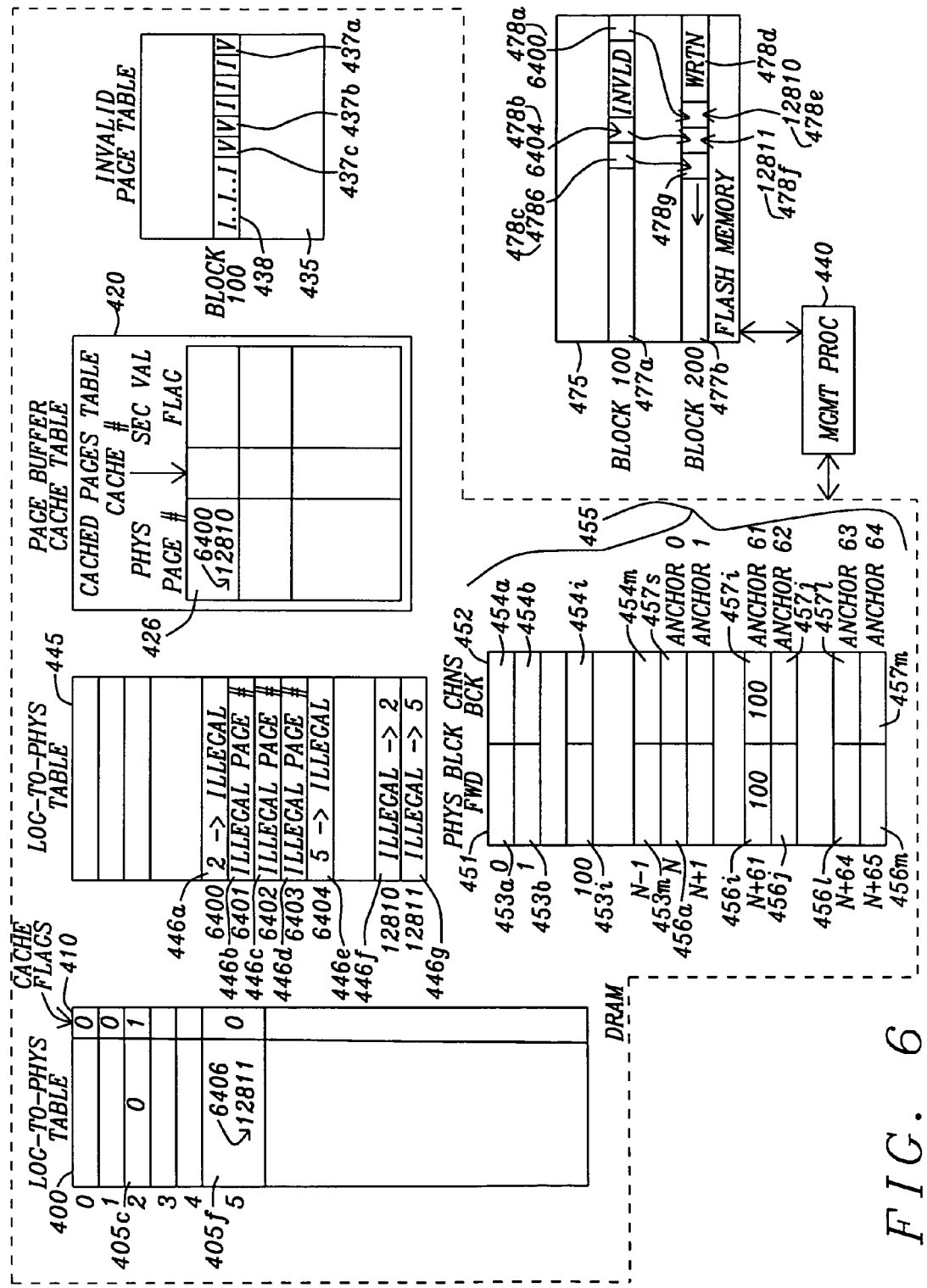
FIG. 6 is a block diagram of tables employed in garbage collection in the page based management of this invention.

Refer now to FIG. 6 for a discussion of the tables employed in garbage collection in the page based management of this invention. A block within one of the array Flash RAM nonvolatile memory devices 475 is chosen for erasure at any given execution of the garbage collection process to be able to use a copy page flash memory device command that is inherent within the Flash RAM nonvolatile memory devices 475 for performance reasons. The block selected for garbage collection is found by scanning the invalid page anchor chains 455 in the Physical Block Chains table 450. The Physical Block Chains table 450 is divided into a forward chain queue 451 and a backward chain queue 452. Doubly linked lists (the forward chain queue 451 and the backward chain queue 452 for the Physical Block Chains table 450) provide for better performance. The extraction or insertion of data is fast, because predecessor and successor are immediately known. In contrast, a simply linked list has to be scanned from the beginning to calculate the predecessor. The block chains have no ordering except the erase count table 480 which is ordered according erase count, lowest count first. While searching the invalid page table 435 for a block for garbage collection, the block with the lowest erase count is chosen. At the end of garbage collection, this block will be erased. Taking the block with the lowest erase count provides the best chance to avoid wearleveling.

The first entries of the forward chain queue 451 and a backward chain queue 452 are correspond to each of the blocks of the one Flash RAM nonvolatile memory device 475 with each of the Flash RAM nonvolatile memory devices 475 having a Physical Block Chains table 450. The entries forward chain queue 451 and the backward chain queue 452 of the Physical Block Chains table 450 that extend beyond the individual block entries 453a, . . . , 453i, . . . , 453m, and . . . , 454a, . . . , 454i, . . . , 454m are the invalid page anchor chains 455

All blocks of a Flash RAM nonvolatile memory device 475 are within one of 65 invalid page anchor chains 455 (0 . . . 64). The invalid page anchor chains 455 are scanned starting at invalid page anchor chain 64 456n and 457n and ending at invalid page anchor chain 0 456a and 457a. The invalid page anchor chain 0 456a and 457a points to the set of individual block entries 453a, . . . , 453i, . . . , 453m, and . . . , 454a, . . . , 454i, . . . , 454m having zero (0) invalid pages and each of the invalid page anchor chains 455 has a listing of the blocks having the number of invalid pages represented by the individual location of the invalid page anchor chains 455. For example, the block 100 at the individual block entry 453i and 454i points to the invalid page anchor chain 455 location N+61 456i and 457i. This indicates that the block 100 has 61 invalid and three (3) valid pages.

Each time, a block within the Flash RAM nonvolatile memory devices 475 has an additional invalid page, the invalid bit within the entry representing the block location 438 within the invalid page table 435 is set to indicate that the page is invalid. In the example of the block 100, the entry for the block 100 438 has three valid pages and all the remaining 61 are invalid. When the additional page is made invalid, the location representing the block within the Physical Block Chains table 450 is unchained from its current chain location in the invalid page anchor chains 455 and chained into the next higher chain location in the invalid page anchor chains 455.

For example, the block 100 453i and 454i is removed or chained out from anchor 61 453i and 454i and inserted or chained into anchor 62 453i and 454i (assuming that anchor 62 453i and 454i is empty). An empty chain is represented by forward/backward chains pointing to its self.

The management processor 440 has the garbage collection process search the invalid page anchor chains 455 to find the block with the highest number of invalid pages to minimize copy overhead. The garbage collection process then instructs the copying of the valid pages 478a, 478b, and 478c from the candidate block for this example block 100 477a to another block within the Flash RAM nonvolatile memory device 475. In this example, the valid pages 478a, 478b, and 478c are written to the erased pages 478e, 478f, and 478g in the block 200 200 477b. The block 200 477b being the designated write block that accepts the pages of data to be written sequentially. The pages 478d are previously written pages that precede the valid pages 478a, 478b, and 478c being copied to the erased pages 478e, 478f, and 478g. If the block 200 477b, becomes full during the copying of the valid pages 478a, 478b, and 478c, another erased block is selected from the erased page anchor chain (anchor 64) 456m and 457m. The erased page anchor chain (anchor 64) 456m and 457m is sorted by an erase count factor such that the block with the lowest erase count is selected when a new block is need for writing.

Once a candidate block 477a is found all its valid pages 478a, 478b, and 478c are copied to erased pages 478e, 478f, and 478g in a second block 477b. Prior to copying the valid pages 478a, 478b, and 478c of the candidate block 477a, all sectors of any of the valid pages 478a, 478b, and 478c of the candidate block 477a that are resident in the page buffers that are "dirty" must be copied. All the non valid sectors are first read from the Flash RAM nonvolatile memory devices 475.

The garbage collection process, as executed on the management processor 440, sets all the valid pages 478a, 478b, and 478c in the invalid page table 435 to invalid after the copying. In the logical-to-physical address translation table 400, the cache flag 410 entry for the logical page location 2 405c indicates that the page of data for the physical page location 6400 478a has been copied to the page buffer 415 at the index location 0. Similarly, the cache flag 410 entry for the logical page location 5 405f indicates that the page of data for the physical location 6404 478b is not resident in the page buffer 415. The physical location (6404) in the entry of the location 405f is changed to the new physical location (12811). Similarly, the page buffer cache table 420 has the entry at the index 0 426 changed from the physical location (6400) to the new physical location (12810).

In the physical-to-logical address table 445, the entry at physical page location 6400 446a is changed from the logical page location 2 to an illegal page identifier. There are two illegal page identifiers. These are the two highest address numbers (0xffffffff, 0xfffffffe) and both mean that the physical page is not associated with a logical page number. The address number 0xffffffff means that the page is erased and the page number 0xfffffffe means this page is invalid. In this case, the logical location 2 is changed to the illegal page identifier 0xfffffffe meaning that the page is invalid. Similarly, the page location entry 6404 446e is changed from the logical location 5 to the illegal page identifier 0xfffffffe. The entries 6401 446b, 6402 446c, and 6403 446d were previously invalidated and therefore have the illegal page identifier 0xfffffffe. The page location entries 12810 446f and 12811 446g are respectively changed from the illegal page identifier 0xffffffff (erased pages) respectively to the logical page number 2 and 5. When all the pages of the block 100 477a are shown as invalid in the invalid page table 435, the block 100 477a is then erased.

Figure 7:
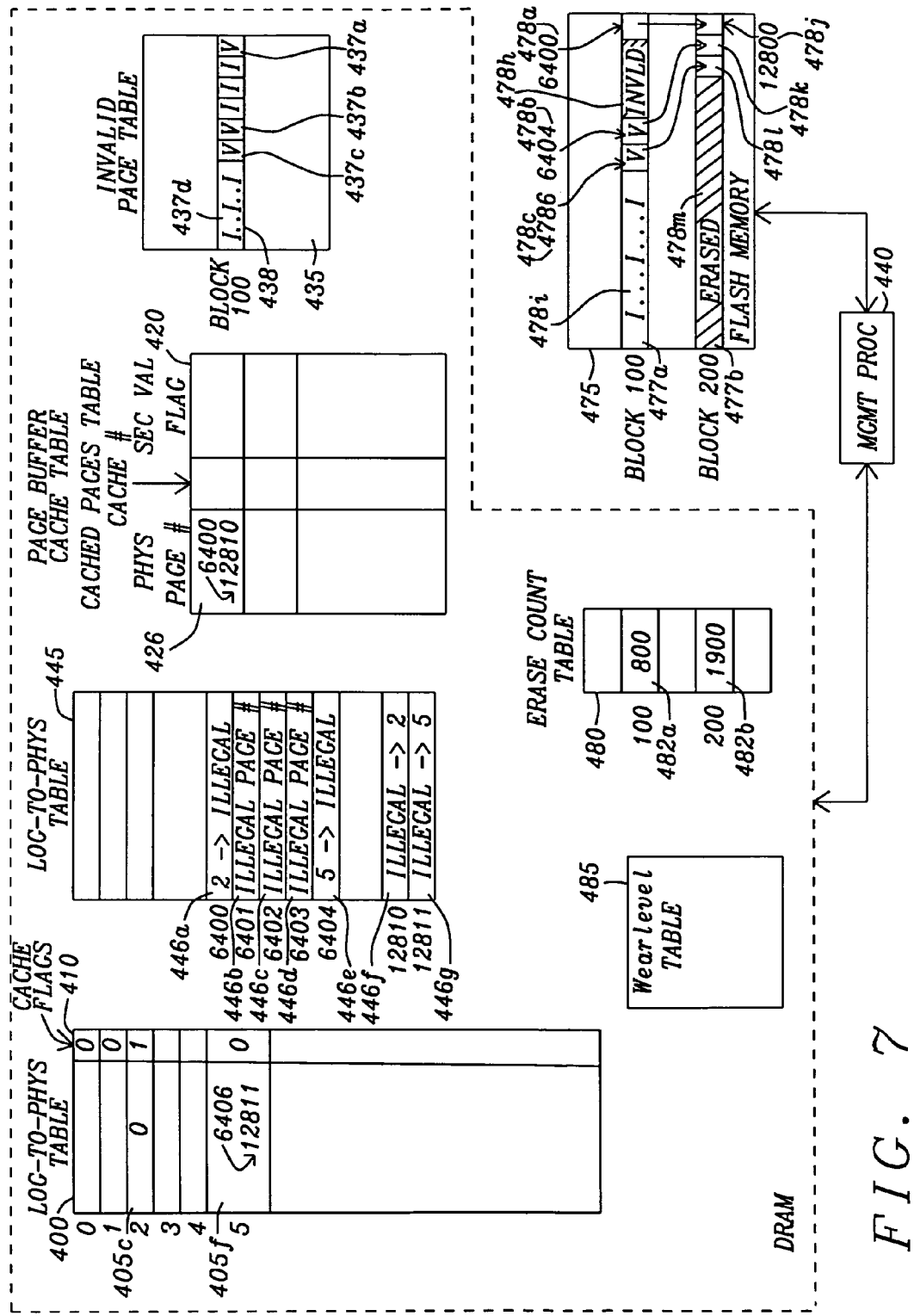
FIG. 7 is a block diagram of tables employed in wearleveling in the page based management of this invention.

When the block 100 438 of the Flash RAM nonvolatile memory devices 475 is erased it is then subjected to wearleveling. The motivation for wearleveling is to wear out the array Flash RAM nonvolatile memory devices 375 of FIG. 4 uniformly. Refer now to FIG. 7 for a discussion of the tables employed in the process of wearleveling in the page based management of this invention. For this example, it is assumed that there are 64 pages per block such that the starting location for block 100 477a is equivalent to the starting location for the page 6400 478a and the starting location for block 200 477b is equivalent to the page 12800 478b.

To explain the operation of wearleveling in the page based management of this invention, the newly erased block 200 477b is erased and the entry location 482b in the erase count table 480 is incremented. The erasure count value at the entry location 482b is compared to an erase count sliding window and if the value in the entry location 482b indicates that it is larger than the erase count sliding window the newly erase block receives the data from a block with the lowest erasure count. To determine the erase count sliding window, the erase count table 480 is searched to determine a block with the lowest erasure count 200 482b. The erase count sliding window is then calculated as the lowest erasure count 200 482b plus a erase count threshold value. If there are multiple blocks having the same erasure and the lowest number of valid pages is designated to become the new spare block. If the erasure count for the newly erased block 200 482b is greater than the erase count sliding widow, the block 100 482a with the minimum erase count is transferred to the newly erased block 200 482b. The block 100 482a with the lowest erase count is copied to the newly erased block 200 482*b* by copying all valid pages 478*a*, 478*b*, and 478*c* sequentially and omitting all invalid pages 478*h* and 478*i* to the front erase pages 478*j*, 478*k* and 478*l* of the block 200 482*b*. The invalid pages 478*h* and 478*i* of the block 100 482*b* become erased pages 478*m* at the end of the block and are used later for writing. As described above, the number of invalid pages is determined from the invalid page table 435. The invalid page table 435 uses a 64 bit word per block to mark invalid pages, where each bit indicates whether a page is valid 437*a*, 437*b* and 437*c* or invalid 437*d*.

In copying the pages from the block 100 477*a* to the block 200 477*b*, the physical-to-logical address table 400 must be updated. The physical-to-logical address table 445 is accessed to find the logical page associated with each of the valid physical page 478*a*, 478*b* and 478*c* in the Flash RAM nonvolatile memory devices 475. The index 446*a* for page 6400 is examined to determine that the logical page 2 is associated with it. Similarly, the index 446*e* is examined for the page 6400 to determine that the logical page 5 is associated with it. The entry index 405*c* for the logical page 2 is examined and it is determined from the cache flags 410 that the page has been copied to the page buffer 415 of FIG. 4. The page buffer cache table 420 entry 426 has the physical page entry number 6400 changed to the physical page 12800. The entry 446*a* of the physical-to-logical address table 445 is updated from the logical page 2 to the illegal page entry 0xfffffffe for an invalid page. The entry index 405*f* indicates that the page is not resident in the page buffer 415 of FIG. 4 and the entry is changed from the physical page entry 6404 to the new physical page entry 12801. The physical-to-logical address table 445 has the entry 446*e* for the logical page 5 changed to the illegal entry 0xfffffffe for an invalid page. The physical-to-logical address table 445 has the entries for the new pages 478*j* and 478*k* updated from the entry 0xffffffff for an erased page respectively to the logical page 2 for the page 12800 446*f* and logical page 5 for the 12801 446*g*. The remaining valid pages 478*c* similarly have their physical page locations updated appropriately. After copying, block 100 477*a* is erased and becomes the new spare block which is used later for writing. The erased pages 478*m* of the block 200 477*b* provide the new spare pages for writing new pages to the Flash RAM nonvolatile memory devices 475. The block 200 482*b* with the spare pages is logged to the wearlevel table 485. If the block 100 477*a* being replaced has invalid pages, the erased block 200 477*b* is not fully overwritten during the wearleveling copy operation, and some erased pages are left. The wearlevel table 485 is used to temporarily retain the locations of the pages that are not overwritten. Once an actual write block is exhausted and before taking a new erased block, the wearlevel table 485 is checked to find those blocks that have spare erased pages. The blocks with the spare erased pages are written first to recycle their erased pages.

The erase count for each block in the erase count table 480 is within a sliding window between a minimum erase count value and the minimum erase count value plus a threshold value. The minimum erase count value is the actual lowest erase count for all blocks of the Flash RAM nonvolatile memory devices 475. The erase count threshold value is usually 4096 for single level cell in Flash RAM nonvolatile memory devices 475 and 512 for multiple level Flash RAM nonvolatile memory devices 475. The erased block chains for every Flash RAM nonvolatile memory device 475 is kept sorted according its erase count. If this lowest erase count is above the sliding window, wearleveling is executed to find a replacement block by scanning the Erase Count table and exchange both blocks. If the lowest erase count search finds duplicate blocks (blocks having the same erase count), the erased block or blocks with the highest count of invalid pages is selected to minimize the copy page overhead. The minimum erase count value is updated by scanning the erase count table 480 for the minimum erase count of the blocks of the Flash RAM nonvolatile memory devices 475. When the minimum erase count value is updated wearleveling is performed again to determine if exchanging blocks is still needed. The sliding window test, as described above, is performed again because the sliding window may have increased.

A memory management circuit may be unique circuitry designed to perform the page based memory management for reading and writing and block erasure of a flash storage system, as described above. In alternate embodiments the memory management circuitry is a computer microcontroller executing a program process that performs the page based memory management of this invention. The computer microcontroller is in communication with a computer readable storage medium that retains the computer program code or firmware that, when executed, performs the program process for managing the array of Flash RAM nonvolatile memory devices.

The firmware for management of the Flash RAM nonvolatile memory devices is a multithreading program that is divided into several layers or threads for eviction, garbage collection, wearleveling, that are running in parallel and are triggered by thresholds. Cache eviction is triggered by a read/write command, if number of free page buffers becomes to low. Eviction of dirty pages needs erased pages in the Flash RAM nonvolatile memory devices, which triggers garbage collection when the number of erased blocks becomes too low. At the end of garbage collection, a block is erased. The block erasure triggers a wearleveling operation, if its erase count becomes too high.

For the multithreading program for management of the Flash RAM nonvolatile memory devices of this embodiment, the program executed by the management processor 340 of FIG. 4 or 440 of FIG. 6 or 7 includes an "idle thread" that is activated when the thresholds of the eviction thread, the garbage collection thread, or the wearleveling thread are not reached. The program executes a loop that, in general, is as follows:

```
While (TRUE)
{
   WaitEvent(SomeEvent);
   Handle SomeEvent;
}
```

The "WaitEvent" function tells the scheduler of the operating system within the management processor 340 of FIG. 4 or 440 of FIG. 6 or 7 to switch to another task, if the "Event" did not happen (i.e. the threshold for the thread has not be reached). The idle thread is activated. The Idle thread contains a sleep instruction that instructs the processor to power down only within the idle thread, if all other threads are waiting and have no work to do.

Figure 8:
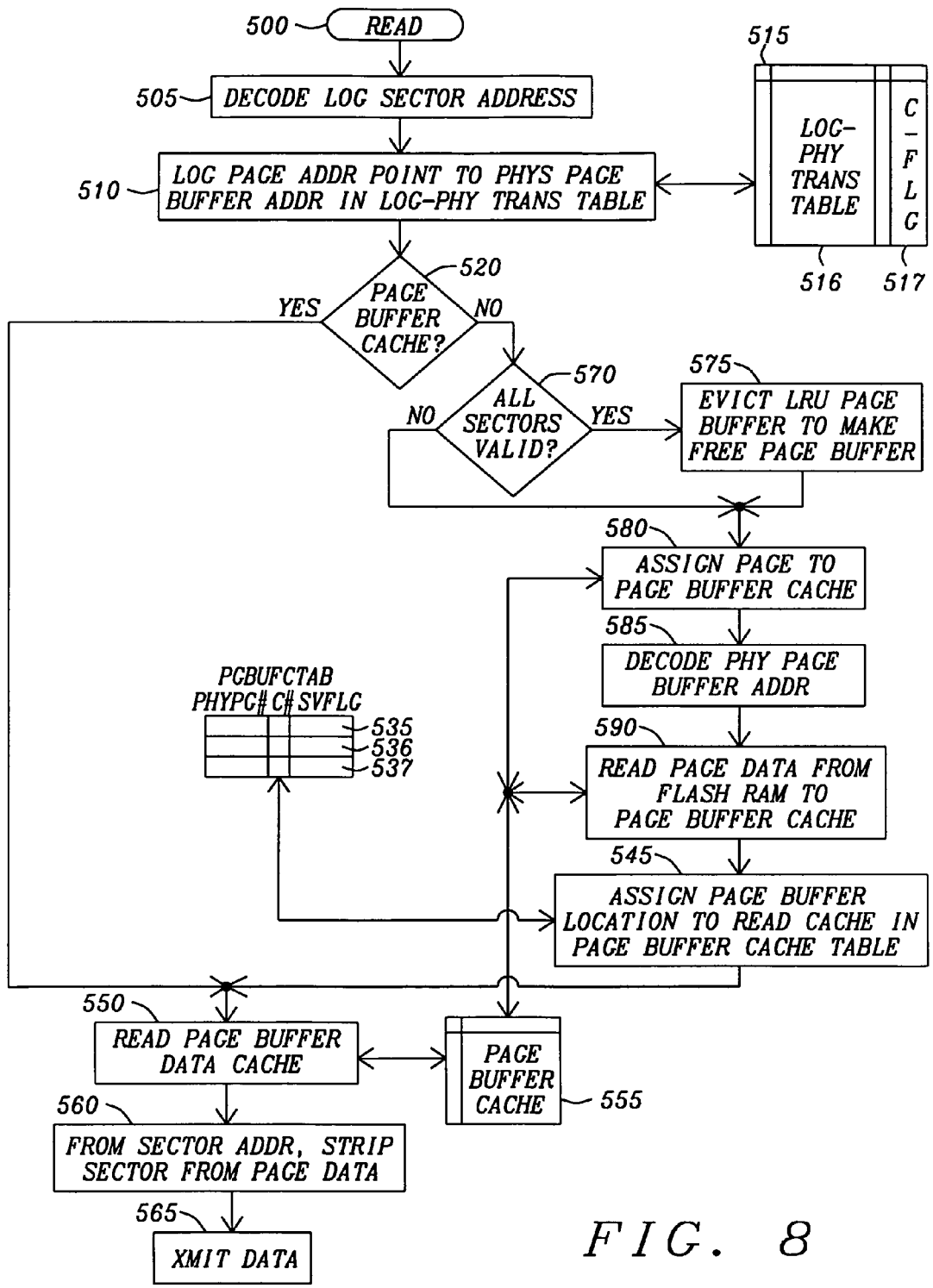
FIG. 8 is a flow diagram for a process for reading data from an array of Flash RAM nonvolatile memory devices in the page based management of this invention.

The top layer only sees page buffer caches. A read command requests for the page buffer cache for the logical page address containing the page data. FIG. 8 is a flow diagram for the process for reading data from the array of Flash RAM nonvolatile memory devices in the page based management of this invention. The read operation (Box 500) begins by decoding (Box 505) a logical sector address for a desired sector of a string of sectors to be read from the array of Flash RAM nonvolatile memory devices. In the ATA standard for a read/write command contains an address indicating a desired a logical sector number (SN) and a sector count (SC). The read/write command starts at the sector number and processes for the number of consecutive sectors indicated by the sector count. As shown in FIG. 4 the logical address is demarcated to define the locations for the sectors, pages, blocks, and chip within the array of Flash RAM nonvolatile memory devices. The logical page address (327, 328, and 329 inclusive of FIG. 4) points (Box 510) to the desired page to be read within the array of Flash RAM nonvolatile memory devices. The logical page address is an index to the logical-to-physical address translation table 515. The logical-to-physical address translation table 515 contains the physical address 516 of the desired data page to be read.

The cache flag 517 provides an indicator whether the data page is resident in the array of Flash RAM nonvolatile memory devices or in a page buffer. If the data page is not in the page buffer, the actual physical address of the page data in the array of Flash RAM nonvolatile memory devices is in the physical address entry 516. If the data page is the page buffer, the index into the page buffer for the data page is in the physical address entry 516. The cache flag is examined (Box 520) to determine if the desired data page is in the page buffer cache.

If the page data is present in the page buffer cache location, the page is read (Box 550) from the page buffer cache 555. The sector data is stripped (Box 560) from the page data and paged in the format of the transmission protocol and transmitted (Box 565) to the external host circuitry.

If the cache flag 517 of logical page address indicates that the page data has not been copied from the array of Flash RAM nonvolatile memory devices, the free list cache is examined (Box 570) to determine if the free list is empty or has sufficient free page buffer locations to accept the page data from the array of Flash RAM nonvolatile memory devices. If the free list is empty and no page buffer cache locations are free, an eviction process is executed (Box 575) to free at least one of the least recently used page buffer cache locations. If there are adequate free page buffer cache locations or the eviction process has been completed, the page buffer location is assigned (Box 580) to receive the page data. The physical page address 516 is extracted from the logical-to-physical address translation table 515 and decoded (Box 585) and the page data is read (Box 590) from array of Flash RAM nonvolatile memory devices to the page buffer cache 555. The page buffer location is removed from the free list of the page buffer cache table 535 and inserted as a read cache entry page buffer cache table 535. The logical-to-physical address translation table 515 is adjusted by setting cache flag 517 and the index of the page buffer location in the least recently used chain table in the page buffer cache table 535 is set to assign (Box 595) the page buffer location. The page is read (Box 550) from the page buffer cache 555. The sector data is stripped (Box 560) from the page data and paged in the format of the transmission protocol and transmitted (Box 565) to the external host circuitry.

Figure 9:
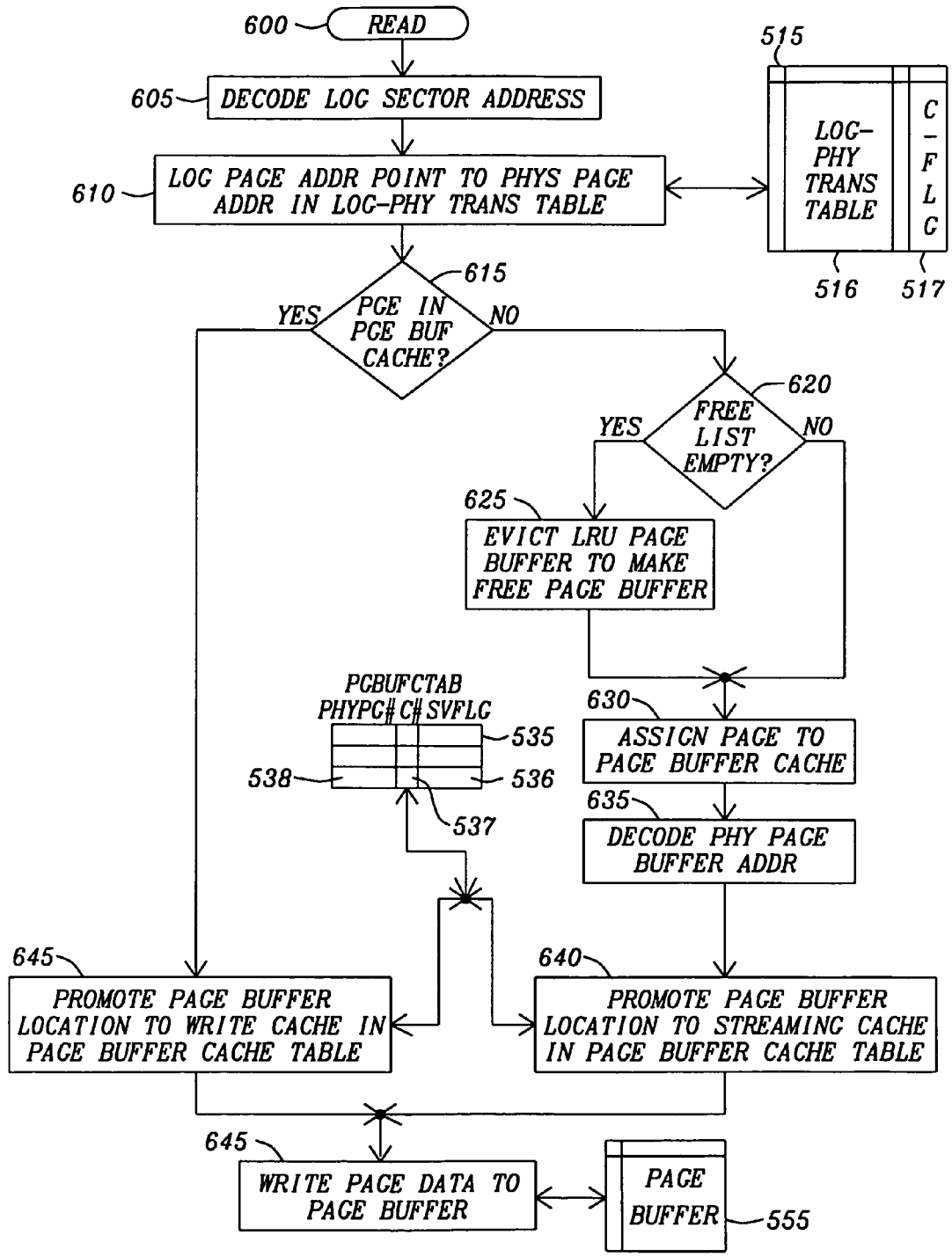
FIG. 9 is a flow diagram for a process for writing data to an array of Flash RAM nonvolatile memory devices in the page based management of this invention.

A write command requests a page buffer cache location to receive the data page associated with the logical page address. Refer now to FIG. 9 for a description of the process for writing (Box 600) page data to an array of Flash RAM nonvolatile memory devices in the page based management of this invention. The write operation (Box 600) begins by decoding (Box 605) a logical sector address for a desired sector of string of sectors to be read from the array of Flash RAM nonvolatile memory devices. As shown in FIG. 4, the logical address is demarcated to define the locations for the sectors, pages, blocks, and chip within the array of Flash RAM nonvolatile memory devices. The logical page address (327, 328, and 329 inclusive of FIG. 4) points (Box 610) to the desired page to be read within the array of Flash RAM nonvolatile memory devices. The logical page address is an index to the logical-to-physical address translation table 515. The logical-to-physical address translation table 515 contains the physical address 516 of the desired data page to be read.

The cache flag 517 provides an indicator whether the data page is resident in the array of Flash RAM nonvolatile memory devices or in a page buffer. If the data page is not in the page buffer, the actual physical address of the page data in the array of Flash RAM nonvolatile memory devices is in the physical address entry 516. If the data page is the page buffer, the index into the page buffer for the data page is in the physical address entry 516. The cache flag is examined (Box 615) to determine if the desired data page is in the page buffer cache.

If the page data is present in the page buffer cache location, the page buffer location is promoted (Box 645) to the write cache in the cache mode entry 537 of the page buffer cache table 535. The page data is written (Box 650) to the page buffer cache 555.

If the cache flag 517 of logical page address indicates that the page data has not been copied from the array of Flash RAM nonvolatile memory devices, the free list cache is examined (Box 620) to determine if the free list is empty or has sufficient free page buffer locations to accept the page data from the array of Flash RAM nonvolatile memory devices. If the free list is empty and no page buffer cache locations are free, an eviction process is executed (Box 625) to free at least one of the least recently used page buffer cache locations. If there are adequate free page buffer cache locations or the eviction process has been completed, the page buffer location is assigned (Box 630) to receive the page data. The physical page address 516 is extracted from the logical-to-physical address translation table 515 and decoded (Box 635). The page buffer location is promoted (Box 640) to the streaming cache in the cache mode entry 537 of the page buffer cache table 535. The page is written (Box 650) to the page buffer cache 555.

The second layer of the firmware is the cache eviction threads (Box 575 of FIG. 8 and Box 625 of FIG. 9). If, for example, a Solid State Disk System has eight (8) channels and eight (8) ready busy lines per channel and populated with 64 Flash RAM nonvolatile memory devices, there are as many as 64 eviction threads which may write one page from cache to flash simultaneously. Having one eviction thread per flash is best for high performance but requires too many resources (SRAM for stack memory for each thread). In order to save resources it is also possible to have one eviction thread for multiple flash chips (i.e. 2, or 4, or 8 etc. flash chips per thread)

The eviction threads become active, as soon as a maximum page usage threshold value is reached. The maximum page usage threshold value is the maximum number of page locations populated with page data within the page buffer. When the eviction threads are completed, the number of free page buffers available in the page buffer cache is greater than the maximum page buffer threshold value. The maximum page usage threshold value and the minimum free page buffer value are thresholds that have to be properly selected and maybe dynamically adjusted at runtime depending on workload. The goal is to always have free page buffer cache locations available to avoid latency at the top layer of the firmware when page buffers are required to receive page data.

Figure 10A:
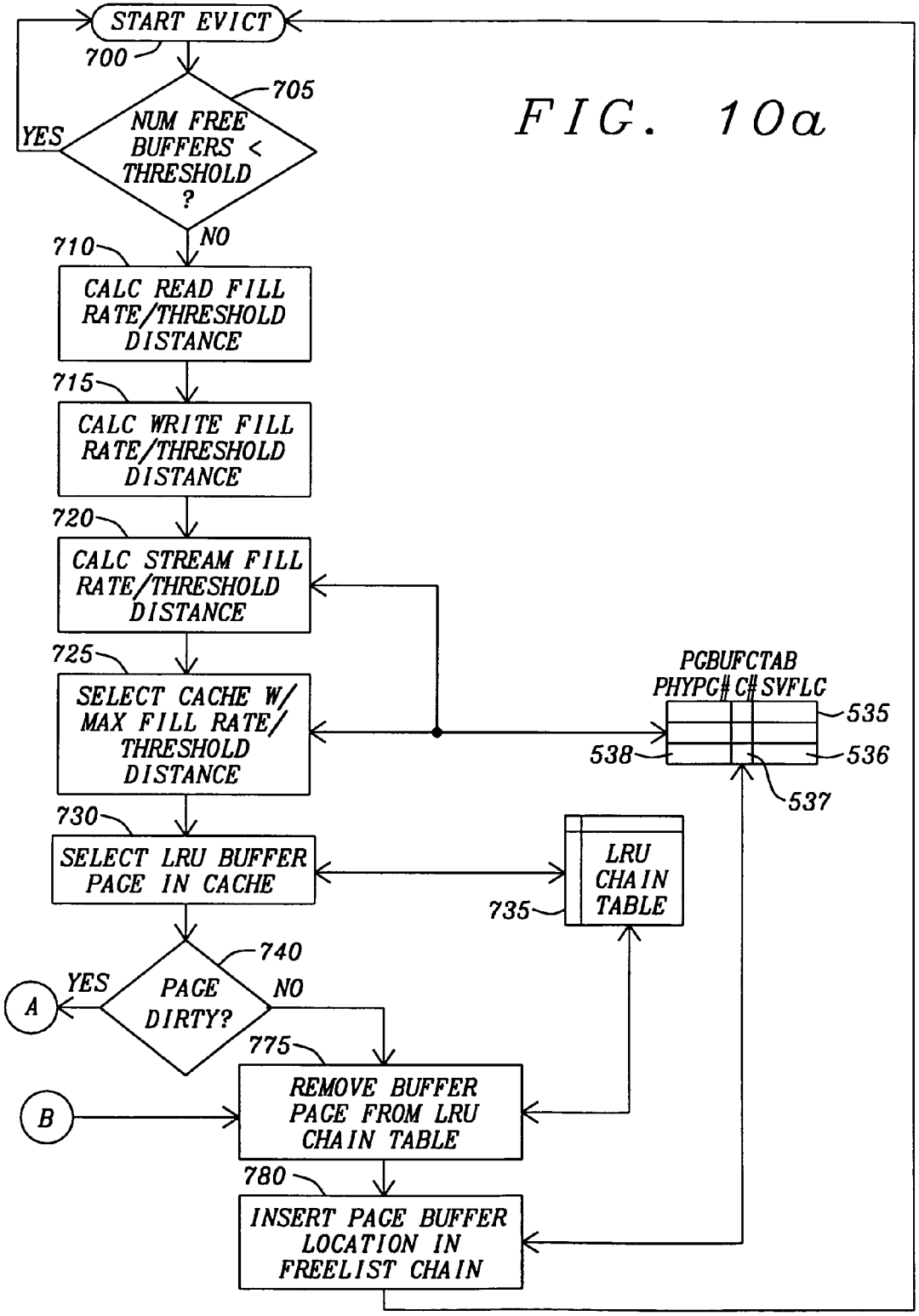
FIGS. 10a and 10b are flow diagrams for a method for evicting a page from a page buffer in the page based management of this invention.
Figure 10B:
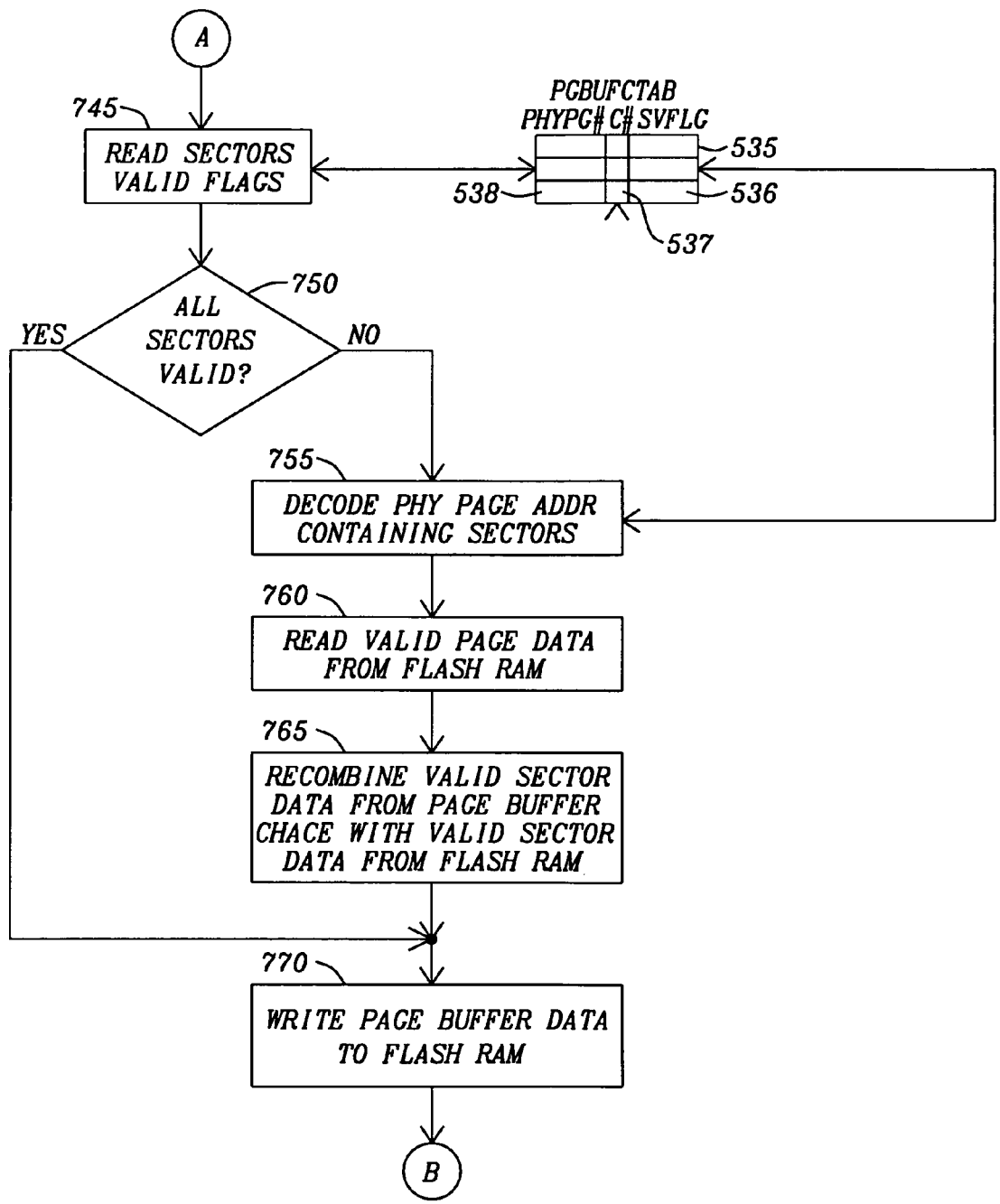

Refer now to FIGS. 10*a* and 10*b* for a description of the method for evicting a page from a page buffer in the page based management of this invention. Page eviction is a background thread, doing something, if the number of free page buffer locations in the page buffer cache is too low. As described above, the page eviction thread is not activated, if there are sufficient page buffer locations assigned to the free list cache. The eviction process frees a page buffer location by writing back its data page contents to flash if it was dirty (was within streaming cache or write cache). The eviction process begins (Box 700) with the scheduler of the operating system of the management processor 340 of FIG. 4 or 440 of FIG. 6 or 7 initiates other threads as long as the number of free list cache members is greater than the minimum free page buffer threshold value. The number of free list cache members is compared (Box 705) to the minimum free page buffer threshold value. If the number of free list cache members is greater than the minimum free page buffer threshold value, the thread loops endlessly to the beginning (Box 700) until the number of free list cache members is less than the minimum free page buffer threshold value. The fill rate for each of the read cache, write cache and the streaming cache is calculated (Boxes 710, 715, and 720). As noted above, each of the read cache, streaming cache, and the write cache have a least recently used ordering in the least recently used chain table 430 of FIG. 5. Additionally, the page buffer cache is partitioned into each of the types of caches which dynamically adjust. The cache to be evicted is based on the deviation from threshold values that are established to partition the page buffer cache. For example write cache may be 50% of the page buffer cache, the read cache may be 35%, and the streaming cache may be 15%. The actual partitioning may be different, because buffers may be moved from one cache to another (read cache→streaming cache, streaming cache→write cache etc.).

The cache (read, write, and streaming) with maximum fill rate or minimum distance to the minimum free page buffer threshold value, or whose size is most above its defined limit is selected (Box 725) from the cache mode number of the page buffer cache table 535. The least recently used page buffer location that is to be evicted is selected (Box 730) from the least recently used chain table 730.

As noted above, the buffer page cache is dirty if it is a member of the streaming cache or write cache. At the selection (Box 725) of the page buffer cache with the maximum fill rate, it is determined (Box 740) if the selected page buffer location is dirty. If the page buffer location is dirty, the sector valid flags 536 are read from the page buffer cache table 535 to determine (Box 745) whether all the sectors contain valid data to be written to the array of Flash RAM nonvolatile memory devices. All the sector valid flags are then tested (Box 740) to determine (Box 750) if the page data in the page buffer location are all valid. If all the sectors of the page data are not valid, the physical address 538 is retrieved from the page buffer cache table 535 and decoded (Box 755). The valid page data is read (Box 760) from the Flash RAM nonvolatile memory devices and recombined (Box 765) with the valid data resident in the page buffer cache.

The page data is written (Box 770) from the page buffer location to the array of Flash RAM nonvolatile memory devices. The evicted page buffer location is removed (Box 775) from its assigned cache in the least recently used. The evicted cache entry is extracted from the lease recently used (LRU) chain of its cache (read/streaming/write cache) selected (Box 725) for eviction and is inserted (Box 780) to the free list chain in the least recently used chain table.

The eviction process is started (Box 700) over and more of the page buffer locations are evicted until the number of free buffer locations are greater than the number the maximum free page buffer threshold value. During the writing of the valid pages to the array of Flash RAM nonvolatile memory devices (Box 770), one erased page location in the array of Flash RAM nonvolatile memory devices is required for each valid data page being evicted from the streaming or write caches of the page buffer cache. There is no write back to the array of Flash RAM nonvolatile memory devices for pages from read cache. All pages are valid. There are only invalid sectors within a page present in the read cache. At some time, all erased free erased pages are used.

The garbage collection process is invoked to manage the block erasure process, as the third layer of the firmware. In the example of the Solid State Disk System that has eight (8) channels and eight (8) ready busy lines per channel and populated with 64 Flash RAM nonvolatile memory devices. There are up to 64 garbage collection threads, which may erase one block each simultaneously in parallel.

The garbage collection process keeps track of which pages are invalid or obsolete. There are four classes of pages: defective pages, written pages, invalid pages and erased pages. Each garbage collection thread selects a block by determining the block with the highest number of invalid pages. If there are several blocks with the same number of invalid pages, the block with the lowest erase count is selected.

Figure 11:
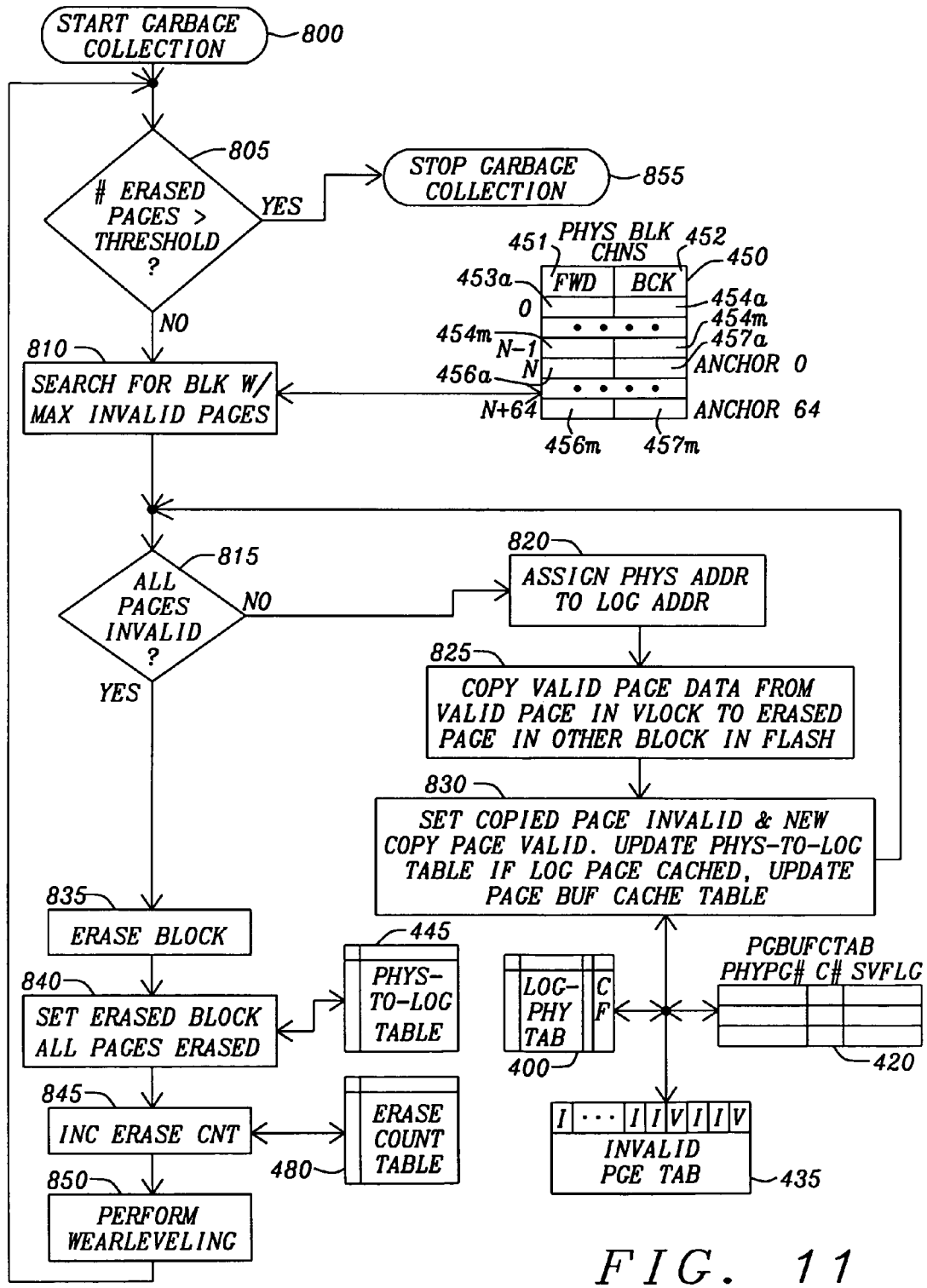
FIG. 11 is a flow diagram for a process of garbage collection in an array of Flash RAM nonvolatile memory devices in the page based management of this invention.

Refer now to FIG. 11 for a detailed description of the process of garbage collection in an array of Flash RAM nonvolatile memory devices in the page based management of this invention. The garbage collection process is a background thread, doing something, if the number of erased page locations in the array of Flash RAM nonvolatile memory devices is too low. The garbage collection process is an endless loop that "idles", if there are sufficient erased pages available in the array of Flash RAM nonvolatile memory devices. The garbage collection process begins (Box 800) with the scheduler of the operating system of the management processor 340 of FIG. 4 or 440 of FIG. 6 or 7 initiating other threads as long as the number of erased page locations of the array of Flash RAM nonvolatile memory devices is less than an erased page threshold value. When the number of erased page locations of the array of Flash RAM nonvolatile memory devices is compared (Box 805) to an erased page threshold value and the number of erased page locations available in the array of Flash RAM nonvolatile memory devices is less than the erased page threshold value, the other threads are initiated and the process loops endlessly to the beginning (Box 800) until the number of erased page locations available is greater than the erased page threshold value. When there are no active threads to execute, an "idle" thread is executed. The "idle" thread includes a "sleep mode" instruction.

When the number of erased page locations available is less than the erased page threshold value, the Physical Block Chains table 450 is searched (Box 810) to find the block with the maximum invalid pages. The block selected for garbage collection is found by scanning the invalid page anchor chains 456*a*, . . . , 456*n* and 457*a*, . . . , 457*n* in the Physical Block Chains table 450. The Physical Block Chains table 450 is divided into a forward chain queue 451 and a backward chain queue 452. The first entries of the forward chain queue 451 and a backward chain queue 452 correspond to each of the blocks of one Flash RAM nonvolatile memory device within the array of Flash RAM nonvolatile memory devices. The entries forward chain queue 451 and the backward chain queue 452 that extend beyond the individual block entries 453*a*, . . . , 453*m*, and 454*a*, . . . , 454*m* are the invalid page anchor chains 455. All blocks of a Flash RAM nonvolatile memory device are within one of 65 invalid page anchor chains array of Flash RAM nonvolatile memory devices (0 ... 64). The invalid page anchor chains array of Flash RAM nonvolatile memory devices are scanned starting at invalid page anchor chain 64 456m and 457m and ending at invalid page anchor chain 0 456a and 457a. The invalid page anchor chain 0 456a and 457a points to the set of individual block entries 453a, ..., 453m, and ..., 454a, ..., 454m having zero (0) invalid pages and each of the invalid page anchor chains 455 has a listing of the blocks having the number of invalid pages represented by the individual location of the invalid page anchor chains 456a, ..., 456m and 457a, ..., 457m Once the block with the maximum invalid pages is selected, it is determined (Box 815) if all pages are invalid in the block. If not all pages are invalid, the physical address for erased pages in the current write block are assigned (Box 820) to the logical address for the valid pages from the block to be erased. The valid page data is copied (Box 825) from the block to be erased to the page locations in the current write block in the Flash RAM nonvolatile memory device. It should be noted that this garbage collection thread is being executed simultaneously over a number of the Flash RAM nonvolatile memory devices.

The copied page of the block to be erased is set to invalid and the new copy of the current write block is set to be valid page data (Box 830) in the invalid page table 435. The logical-to-physical address translation table 400 is updated to reflect that the logical page number is now pointing to a new physical location in the Flash RAM nonvolatile memory device. If the logical page number is resident in cache page buffer, the cached pages table 420 is updated. When all pages are tested as invalid (Box 815), the block is erased (Box 835). All pages for the erased block have all the logical page numbers set (Box 840) to the illegal address code for an erased page (0xffffffff) in the physical-to-logical address table 445. The erasure count for the block is incremented (Box 845) in the erase count table 480. Upon erasure of a block, the wearleveling process is executed (Box 850) to insure that all blocks have approximately the same number of erasures and the Flash RAM nonvolatile memory devices wear out at about the same time. The number of erase pages generated at this time is again compared (Box 805) with the erased page threshold value and the garbage collection is either reiterated or stopped (Box 840).

The motivation for the wearleveling process is to wear out each device of the array of Flash RAM nonvolatile memory devices equally. The erase counts for all blocks in the erase count table are monitored after each block erase is executed during a garbage collection process. The erase counts for each block of the array of Flash RAM nonvolatile memory devices should be within a sliding window. The sliding window is based on the minimum block erase count plus an erase count threshold value. When a block's erase count is greater than the minimum block erase count plus the erase count threshold value, the block with the minimum block erase count is copied to the block with that exceeds the erase count threshold value from the minimum block erase count and the block with the minimum block erase count is erased and becomes a new spare block.

There are two modes of wearleveling: dynamic wearleveling and static wearleveling. In dynamic wearleveling, when there is more than one erased block available the block with the lowest erase count is chosen. In static wearleveling, a part of the array of Flash RAM nonvolatile memory devices is considered read data (static data) that are programmed rarely or only once and read often. Examples of read data are programs, songs, movies etc. Blocks of data having high erase counts are exchanged with blocks of low erase count. This exchanges hot spots of high write activity with blocks of low write activity (static data). The methods and apparatus of this embodiment use both, static wearleveling and dynamic wearleveling.

Figure 12A:
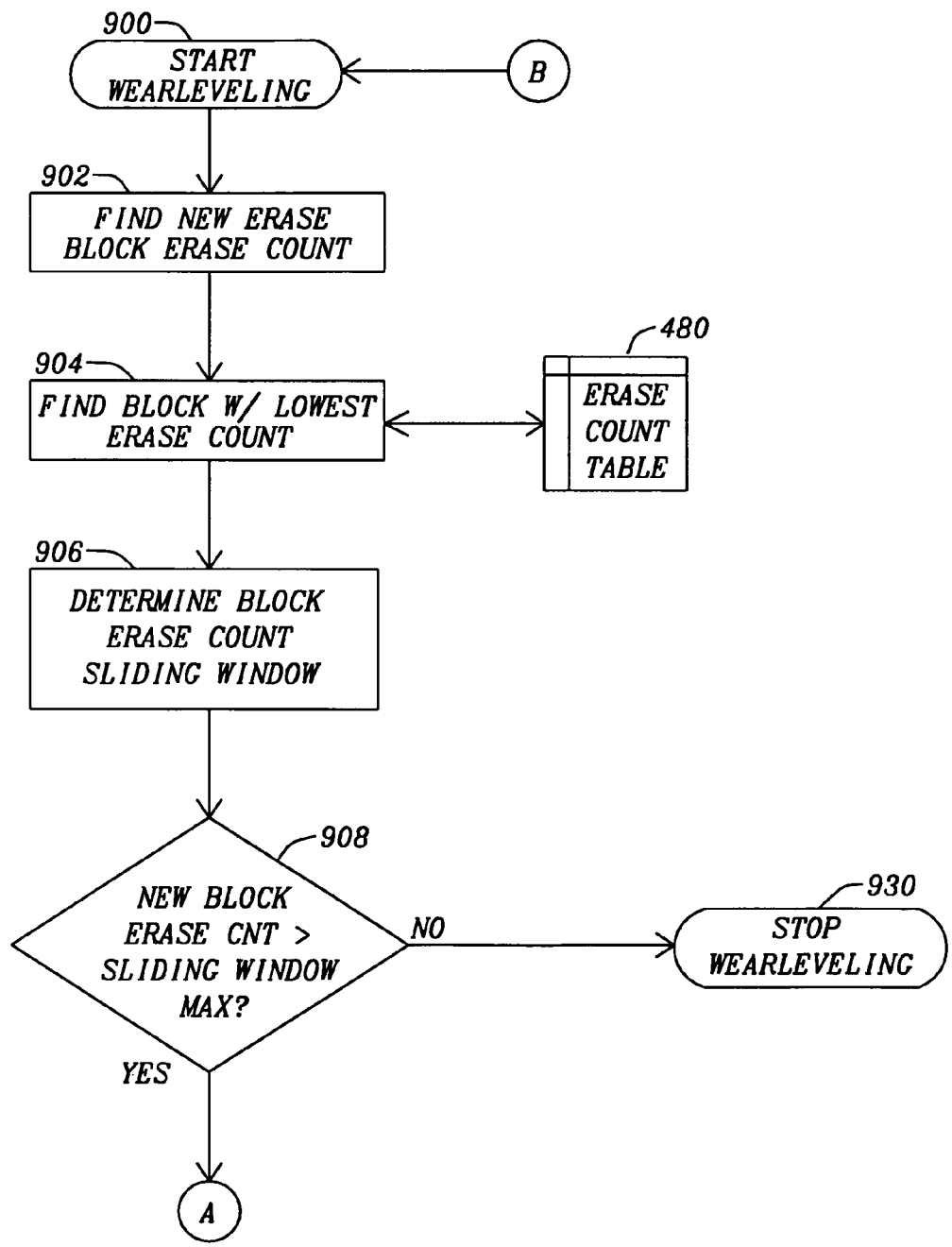
FIGS. 12a, 12b and 12c are flow diagrams for a process of wearleveling in an array of Flash RAM nonvolatile memory devices in the page based management of this invention.
Figure 12B:
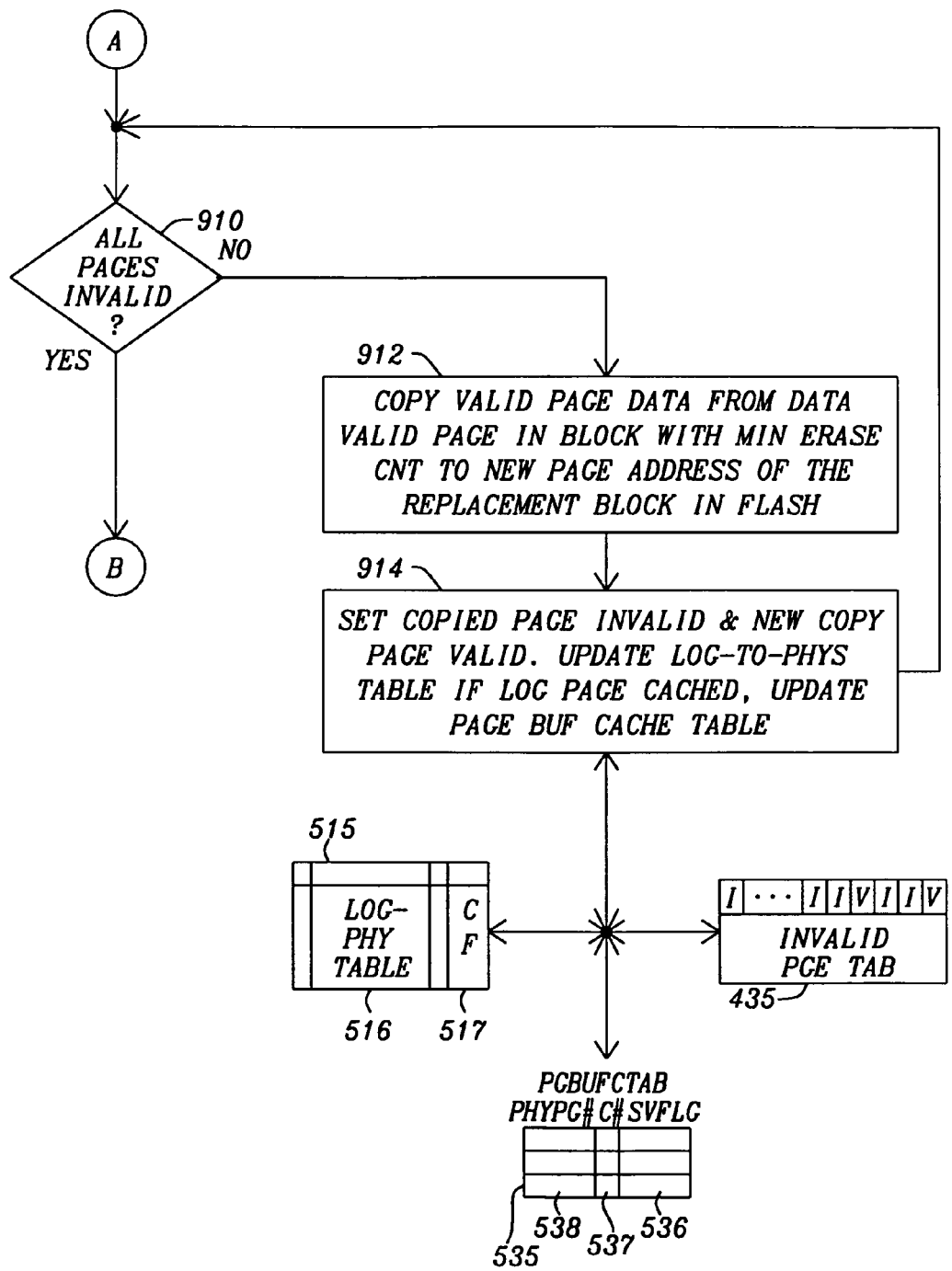
Figure 12C:
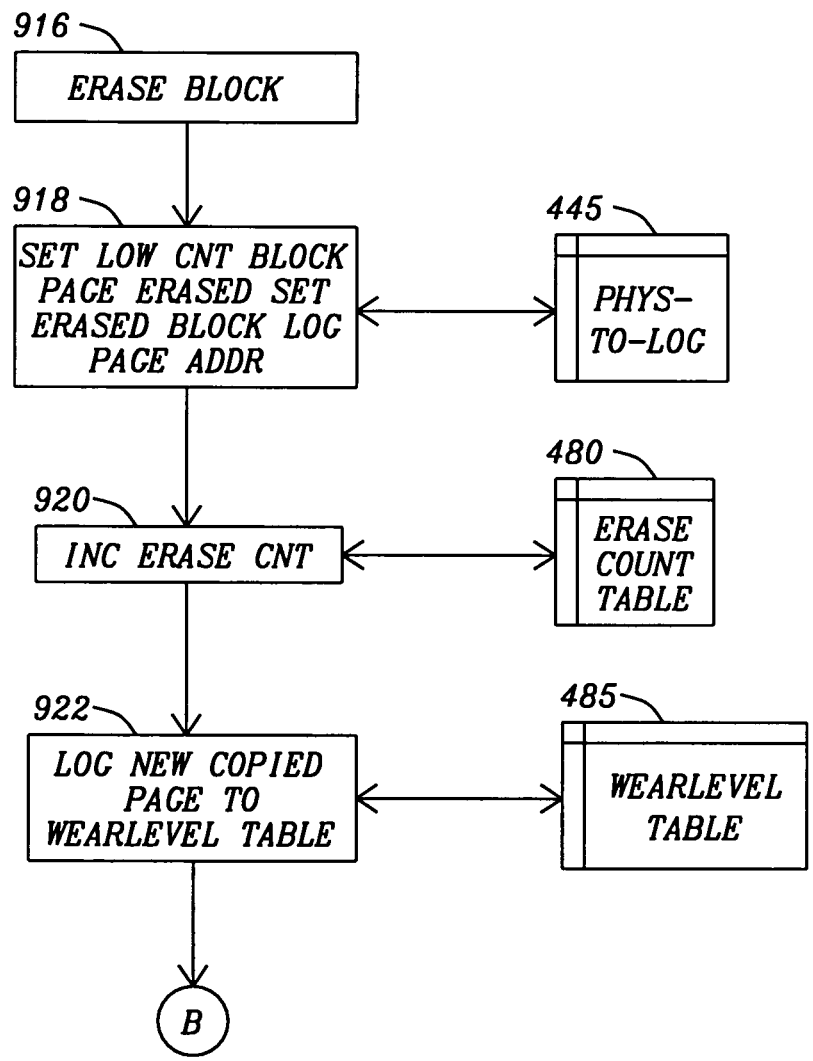

Refer now to FIGS. 12a, 12b and 12c for a description of the process of wearleveling in an array of Flash RAM nonvolatile memory devices in the page based management of this invention. After the erasure of a block during the garbage collection process, the wearleveling process is started (Box 900) by retrieving (Box 902) the erase count of the newly erased block. The erase count of the newly erased block should be within the above described sliding window. The sliding window being the range of erase counts from the lowest erase count for a block of each Flash RAM nonvolatile memory device with the minimum number of erasures plus an erase count threshold level. For example, the erase count threshold level is approximately 512 for multi-level Flash RAM nonvolatile memory cells or 4096 for single-level Flash RAM nonvolatile memory cells.

Alternately, rather than the newly erased block, the block having the maximum erase count of all the blocks present in the array of Flash RAM nonvolatile memory devices is found by searching the erase count table 480. The erase count table 480 is searched (Box 904) to find the block with the minimum erase count. An erase count distance of sliding window is determined (Box 906) as the erase count of the block with the minimum erase count plus the erase count threshold value (Lowest Erase Count+N, where N is the erase count threshold level). For best wearleveling the erase count table 480 should be scanned for the erase counts of all blocks of all the of Flash RAM nonvolatile memory devices. If this complete scan takes too much time, a good approximation is to start randomly and search a fixed part of the erase count table 480 (i.e. one half or a randomly through a part of the erase count table 480. If an incomplete scan is used to determine the block with the minimum erase count, a random function must be used in the search for the block with the minimum erase count. If the scan goes beyond the end of the drive, continue at the beginning.

The erase count of the newly erase block is then compared (Box 908) to the erase count sliding window value. If the erase count distance is not greater than the erase count threshold, the wearleveling process is stopped (Box 930). If the erase count distance is greater than the erase count threshold, the block with the minimum erase count is designated to become the new spare block. All the pages of the block with the minimum erase count are tested (Box 910) to determine if all the pages are invalid. If all the pages are not invalid, the valid pages of the block with the minimum erase count are copied (Box 912) to the newly erased block. The copied pages of the block with the minimum erase count are set (Box 914) to be invalid and the newly copied page in the newly erased block are set (Box 914) to valid. The logical-to-physical translation table 516 is updated. If the cache flag 517 indicates that the logical page is cached, the page buffer cache table 535 is updated such that the page buffer location 538 contains the newly erased block's physical location and the cache location is promoted to the write cache in the cache mode entry 537 of the page buffer cache table 535. The copy process is executed until all pages are invalid when the validity of the pages of the block with the minimum erase count is tested (Box 910).

The invalid pages are not copied. The invalid pages of the block with the minimum erase count become erased pages in the newly erased block. It should be noted that the valid pages are copied sequentially to the new replacement block. For example, if the replacement block has three invalid pages which are not copied, the last three pages of the newly erased block are untouched and remain erased. When all the pages of the block with the minimum erase count are invalid, it is then erased (Box 916).

The pages of the block with the minimum erase count are set (Box 918) to the illegal address code for an erased page (0xffffffff) in the physical-to-logical address table 445. The erase count table 480 is incremented (Box 920) for the block with the minimum erase count. If the replacement block with the newly copied pages has erased pages, it is logged (Box 922) into the wearlevel table as having spare erased pages for use when the current write block becomes full. The wearleveling process is stopped (Box 930) at this time. However, alternatively, the process maybe iterated to determine if exchanging blocks is still needed.

In some embodiments of the page based management of an array of Flash RAM nonvolatile memory devices, the three layers (eviction, garbage collection, and wearleveling) are executed simultaneously when needed. The eviction and garbage collection should run ahead of the read and write operation to provide the top layer with page buffer locations in the page buffer cache. The operation of the page based management of an array of Flash RAM nonvolatile memory devices should only stall in rare cases to wait for free page buffer locations.

The embodiment as described above provides for a page based management of an array of Flash RAM nonvolatile memory devices with page reads and write and block level erasure. This provides a strong performance for random write. Other embodiments provide use of sub-blocks instead of pages, where one sub-block is any number of pages. Then one block consists of the multiple of sub-blocks. The larger sub-blocks means that the size of all internal tables decreases, sub-block recombination overhead increases, and garbage collection overhead decreases. Having larger sub-blocks improves sequential write and worsens random write. Other embodiment employ different sub-block sizes at the same time, to optimize random and sequential write performance depending on work load.

For practical reasons the number of pages in a sub-block should be a power of 2 (i.e. 1, 2, 4, 8, 16, 32). This guarantees that number of pages per block is divisible by N without remainder. The sub-blocks are constructed basically in two ways: A sub-block (or alternately, a super page) is part of a physical block. So a physical block is divided into a number of sub-blocks that is a factor of two multiple of pages. For instance if the block consists of sixty-four (64) pages, and there are sixteen (16) sub-blocks, then one sub-block is composed by four (4) physical pages. The block tables now remain the same, but the page tables (logical-to-physical address translation table 400 and physical-to-logical address table 445 are one quarter the size). In this embodiment, writing to a sub-block is writing sequentially to 4 consecutive pages.

Another way is to compose super-blocks as blocks on separate arrays of Flash RAM nonvolatile memory devices. For example one block on each of four different arrays of Flash RAM nonvolatile memory devices compose a super-block. A four page sub-block then has four physical pages, every physical page being from a different array of Flash RAM nonvolatile memory devices. There are now smaller page tables and smaller block tables. The cache management is now based on the number of super-blocks. The number of super-blocks is a fraction of the number of physical blocks. In the case of four blocks on four different arrays of Flash RAM nonvolatile memory devices, the number of super-blocks is one-quarter the number of physical blocks. Additionally, each sub-block is able to be written in parallel, because all physical pages of a sub-block are located on different chips to provide interleaved parallel access to the arrays of Flash RAM nonvolatile memory devices.

While this invention has been particularly shown and described with reference to the preferred embodiments thereof, it will be understood by those skilled in the art that various changes in form and details may be made without departing from the spirit and scope of the invention.

The invention claimed is:

1. A data storage system comprising:
   an array of nonvolatile memory devices comprising multiple blocks of sub-arrays that are comprising a plurality of sub-blocks where each sub-block comprises a plurality of sectors and each sector comprising a plurality of bytes of memory cells;
   a management processor in communication with the array of nonvolatile memory devices to provide control signals for programming of selected sub-blocks, erasing selected blocks, and reading selected sub-blocks of the array of nonvolatile memory devices;
   a sub-block buffer in communication with the array of nonvolatile memory devices and the management processor and partitioned into sub-block segments for temporarily storing data that is read from or to be transferred to the array of nonvolatile memory devices as determined by control signals received from the management processor;
   a logical-to-physical translation table that receives a requested logical sub-block address and translates the logical sub-block address to a physical sub-block address and in communication with the management processor to transfer the physical sub-block address to the management processor for identifying a physical location of a desired sub-block within the array of nonvolatile memory devices, wherein the logical-to-physical translation table comprises a cache flag table identifying if the requested logical sub-block address is present in the sub-block buffer;
   an input/output adapter connected between an external port and the sub-block buffer and the management processor to receive a logical address, control, and sectors of data encoded in a communication format and translating the logical address, control, and data encoded in the communication format to a format acceptable by the array of nonvolatile memory devices;
   a physical address decoder in communication with the input/output adapter to receive the logical address, in communication with the logical-to-physical translation table to transmit the logical address to the logical-to-physical translation table and receive a physical address from the logical-to-physical translation table, and in communication with the management processor to identify that a requested sub-block of data is resident in the sub-block buffer or the array of nonvolatile memory devices; and
   sub-block buffer cache table in communication with the management processor and comprising a physical sub-block number identifying a physical location within the array of nonvolatile memory devices associated with a sub-block location within the sub-block buffer, a cache type entry designating a cache type occupied by the physical location, and a status entry classifying the sectors of the sub-block according to a validity status.

2. The data storage system of claim 1 wherein the sub-block is a page, a super-page composed of single blocks within multiple arrays of nonvolatile memory devices, or super page composed of multiple pages with a block.

3. The data storage system of claim 1 wherein the cache types comprise a read cache, streaming cache, write cache, and free list.

4. The data storage system of claim 1 further comprising a least-recently-used table comprising chaining pointers for determining a least recently used sub-block of data resident in the sub-block buffer.

5. The data storage system of claim 4 where during an eviction process of the sub-block buffer by the management processor, the least recently used sub-block of data resident in the sub-block buffer is evicted from the sub-block buffer and written to its designated sub-block within the array of nonvolatile memory devices and the sub-block location within the sub-block buffer is added to the free list of the sub-block buffer cache table.

6. The data storage system of claim 1 further comprising an invalid sub-block table indicating which sub-blocks with selected block of the array of nonvolatile memory devices are valid.

7. The data storage system of claim 1 further comprising a physical-to-logical table for mapping the physical location of the array of nonvolatile memory devices to the logical location wherein an illegal sub-block number indicates that the physical location is erased or invalid.

8. The data storage system of claim 1 further comprising an erase count table in communication with the management processor to maintain an erase count for each block of the array of nonvolatile memory devices.

9. The data storage system of claim 1 further comprising a physical block chain table in communication with the management processor and comprising a linked listing containing pointers for each block of the array of nonvolatile memory devices containing an anchor pointer defining the number of invalid sub-blocks within the block.

10. The data storage system of claim 8 wherein during a garbage collection process of the array of nonvolatile memory devices executed by the management processor, the anchor pointer indicates the block of the array of nonvolatile memory devices having the highest number of invalid sub-blocks and thus permits selection of the block with the highest number of invalid sub-blocks for erasure.

11. The data storage system of claim 10 wherein during a wearleveling process an erased block has its erasure count compared to a maximum count and if the maximum count is exceeded, a block having a lowest erased count is selected and all valid sub-blocks are copied to the low order sub-blocks of the erased block, the block with the lowest erase count is erased, and the newly erased block has its erasure count incremented and it becomes a new spare block available for writing.

12. A memory management circuit for sub-block based reading and writing and block erasure of a flash storage system, wherein the memory management circuit comprises:
a management processor in communication with an array of nonvolatile memory devices within the flash storage system to provide control signals for the programming of selected sub-blocks, erasing selected blocks, and reading selected sub-blocks of the array of nonvolatile memory devices;
a sub-block buffer in communication with the array of nonvolatile memory devices and the management processor and partitioned into sub-block segments for temporarily storing data that are read from or to be transferred to the array of nonvolatile memory devices as determined by control signals received from the management processor;
a logical-to-physical translation table that receives a requested logical sub-block address and translates the logical sub-block address to a physical sub-block address and in communication with the management processor to transfer the physical sub-block address to the management processor for identifying a physical location of a desired sub-block within the array of nonvolatile memory devices, wherein the logical-to-physical translation table comprises a cache flag table identifying if the requested logical sub-block address is present in the sub-block buffer;
an input/output adapter connected between an external port and the sub-block buffer and the management processor to receive a logical address, control, and sectors of data encoded in a communication format and translating the logical address, control, and data encoded in the communication format to a format acceptable by the array of nonvolatile memory devices;
a physical address decoder in communication with the input/output adapter to receive the logical address, in communication with the logical-to-physical translation table to transmit the logical address to the logical-to-physical translation table and receive a physical address from the logical-to-physical translation table, and in communication with the management processor to identify that a requested sub-block of data is resident in the sub-block buffer or the array of nonvolatile memory devices; and
a sub-block buffer cache table in communication the management processor and comprising a physical sub-block number identifying a physical location within the array of nonvolatile memory devices associated with a sub-block location within the sub-block buffer, a cache type entry designating a cache type occupied by the physical location, and a status entry classifying the sectors of the sub-block according to a validity status.

13. The memory management circuit of claim 12 wherein the sub-block is a page, a super-page composed of single blocks within multiple arrays of nonvolatile memory devices, or super page composed of multiple pages with a block.

14. The memory management circuit of claim 12 wherein the cache types comprise a read cache, streaming cache, write cache, and free list.

15. The memory management circuit of claim 12 further comprising a least-recently-used table comprising chaining pointers for determining a least recently used sub-block of data resident in the sub-block buffer.

16. The memory management circuit of claim 15 where during an eviction process of the sub-block buffer by the management processor, the least recently used sub-block of data resident in the sub-block buffer is evicted from the sub-block buffer and written to its designated sub-block within the array of nonvolatile memory devices and the sub-block location within the sub-block buffer is added to the free list of the sub-block buffer cache table.

17. The memory management circuit of claim 13 further comprising an invalid sub-block table indicating which sub-blocks with selected block of the array of nonvolatile memory devices are valid.

18. The memory management circuit of claim 13 further comprising a physical-to-logical table for mapping the physical location of the array of nonvolatile memory devices to the logical location wherein an illegal sub-block number indicates that the physical location is erased or invalid.

19. The memory management circuit of claim 13 further comprising an erase count table in communication with the management processor to maintain an erase count for each block of the array of nonvolatile memory devices.

20. The memory management circuit of claim 13 further comprising a physical block chain table in communication with the management processor and comprising a linked listing containing pointers for each block of the array of nonvolatile memory devices containing an anchor pointer defining the number of invalid sub-blocks within the block.

21. The memory management circuit of claim 19 wherein during a garbage collection process of the array of nonvolatile memory devices executed by the management processor, the anchor pointer indicates the block of the array of nonvolatile memory devices having the highest number of invalid sub-blocks and thus permits selection of the block with the highest number of invalid sub-blocks for erasure.

22. The memory management circuit of claim 21 wherein during a wearleveling process an erased block has its erasure count compared to a sliding window erase count and if the sliding window erase count is exceeded, a block having a lowest block erase count is selected and all valid sub-blocks are copied to the low order sub-blocks of the erased block, the block with the lowest block erase count is erased, and the newly erased block has its erasure count incremented and it becomes a new spare block available for writing.

23. The memory management circuit of claim 22 wherein during the wearleveling process the sliding window erase count is calculated as the lowest block erase count plus a block erase count threshold value.

* * * * *